United States Patent
Lim et al.

(10) Patent No.: US 10,554,921 B1
(45) Date of Patent: Feb. 4, 2020

(54) GAZE-CORRECT VIDEO CONFERENCING SYSTEMS AND METHODS

(71) Applicant: MICROSOFT TECHNOLOGY LICENSING, LLC, Redmond, WA (US)

(72) Inventors: Se Hoon Lim, Bellevue, WA (US); Timothy Andrew Large, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/056,446

(22) Filed: Aug. 6, 2018

(51) Int. Cl.
| | |
|---|---|
| *H04N 7/14* | (2006.01) |
| *H04N 5/445* | (2011.01) |
| *H04N 7/15* | (2006.01) |
| *H04N 5/272* | (2006.01) |
| *H04N 5/247* | (2006.01) |

(Continued)

(52) U.S. Cl.
CPC ..... *H04N 5/44504* (2013.01); *G06K 9/00597* (2013.01); *G06T 7/50* (2017.01); *G06T 7/70* (2017.01); *H04N 5/247* (2013.01); *H04N 5/272* (2013.01); *H04N 7/144* (2013.01); *H04N 7/15* (2013.01); *G06T 7/194* (2017.01); *H04N 5/2628* (2013.01); *H04N 9/04* (2013.01)

(58) Field of Classification Search
CPC ......... G06K 9/00597; G06T 7/50; G06T 7/70; G06T 7/194; H04N 5/44504; H04N 5/247; H04N 5/272; H04N 5/2628; H04N 7/144; H04N 7/15; H04N 7/194; H04N 9/04

USPC ......... 348/14.01, 14.02, 14.03, 14.04, 14.05, 348/14.06, 14.07, 14.08, 14.09, 14.1, 348/14.11, 14.12, 14.13, 14.14, 15.15, 348/14.16; 382/275; 379/265.03; 455/414.1, 566; 704/270

See application file for complete search history.

(56) References Cited

U.S. PATENT DOCUMENTS

| | | | | |
|---|---|---|---|---|
| 5,953,052 A | * | 9/1999 | McNelley | H04N 7/144 313/478 |
| 5,963,250 A | * | 10/1999 | Parker | H04N 5/232 348/14.05 |

(Continued)

OTHER PUBLICATIONS

Giger, et al.. "Gaze Correction with a Single Webcam", 2014 IEEE International Conference on Multimedia and Expo (ICME), Jul. 2014.

(Continued)

*Primary Examiner* — Khai N. Nguyen
(74) *Attorney, Agent, or Firm* — NovoTechIP International PLLC

(57) ABSTRACT

Techniques for video conferencing including obtaining a first image captured by a camera through a display device of a first device, receiving at the first device live images of a first participant of a video conferencing session, displaying a first composite image on the display device with an image portion of the eyes of the first participant at a lateral position corresponding to the camera, segmenting a foreground image from the first image that corresponds to a second participant of the video conferencing session, and causing via the video conferencing session a second composite image of the second device at a different geographic location, in which the second composite image includes the foreground image composited with a background image.

22 Claims, 19 Drawing Sheets

(51) Int. Cl.
*G06T 7/50* (2017.01)
*G06K 9/00* (2006.01)
*G06T 7/70* (2017.01)
*H04N 9/04* (2006.01)
*H04N 5/262* (2006.01)
*G06T 7/194* (2017.01)

(56) References Cited

U.S. PATENT DOCUMENTS

| | | | |
|---|---|---|---|
| 8,432,432 B2 | 4/2013 | Cutler | |
| 8,908,008 B2* | 12/2014 | Tan | H04N 7/144 |
| | | | 348/14.01 |
| 9,424,467 B2* | 8/2016 | Lawler | G06K 9/00597 |
| 9,485,414 B2* | 11/2016 | Visosky | G06K 9/00281 |
| 10,075,656 B2* | 9/2018 | Oetting | H04N 5/272 |
| 2006/0181607 A1* | 8/2006 | McNelley | G02B 27/2292 |
| | | | 348/14.08 |
| 2010/0026712 A1 | 2/2010 | Aliprandi et al. | |
| 2011/0102538 A1 | 5/2011 | Tan | |
| 2012/0050458 A1 | 3/2012 | Mauchly et al. | |
| 2013/0093838 A1 | 4/2013 | Tan et al. | |
| 2014/0092200 A1 | 4/2014 | Pham et al. | |
| 2014/0267771 A1* | 9/2014 | Lawler | G06K 9/00597 |
| | | | 348/169 |
| 2014/0313277 A1 | 10/2014 | Yarosh et al. | |
| 2015/0009277 A1* | 1/2015 | Kuster | G06T 15/205 |
| | | | 348/14.07 |
| 2015/0091900 A1 | 4/2015 | Yang et al. | |
| 2015/0248167 A1 | 9/2015 | Turbell et al. | |
| 2015/0341593 A1 | 11/2015 | Zhang et al. | |
| 2015/0373303 A1* | 12/2015 | Visosky | G06K 9/00281 |
| | | | 348/14.05 |
| 2016/0309081 A1 | 10/2016 | Frahm et al. | |
| 2016/0323540 A1 | 11/2016 | Nilsson et al. | |
| 2016/0323541 A1* | 11/2016 | Nilsson | G06K 9/00758 |
| 2016/0337570 A1 | 11/2016 | Tan et al. | |
| 2017/0019628 A1* | 1/2017 | Visosky | G06K 9/00281 |
| 2017/0187966 A1* | 6/2017 | Oetting | H04N 5/272 |
| 2017/0308734 A1* | 10/2017 | Chalom | G06K 9/0061 |

OTHER PUBLICATIONS

Kuster, et al., "Gaze Correction for Home Video Conferencing", In ACM Transactions on Graphics, vol. 31, Issue 6, Nov. 2012.

"International Search Report and Written Opinion Issued in PCT Application No. PCT/US2019/040009", dated Sep. 27, 2019, 14 Pages.

* cited by examiner

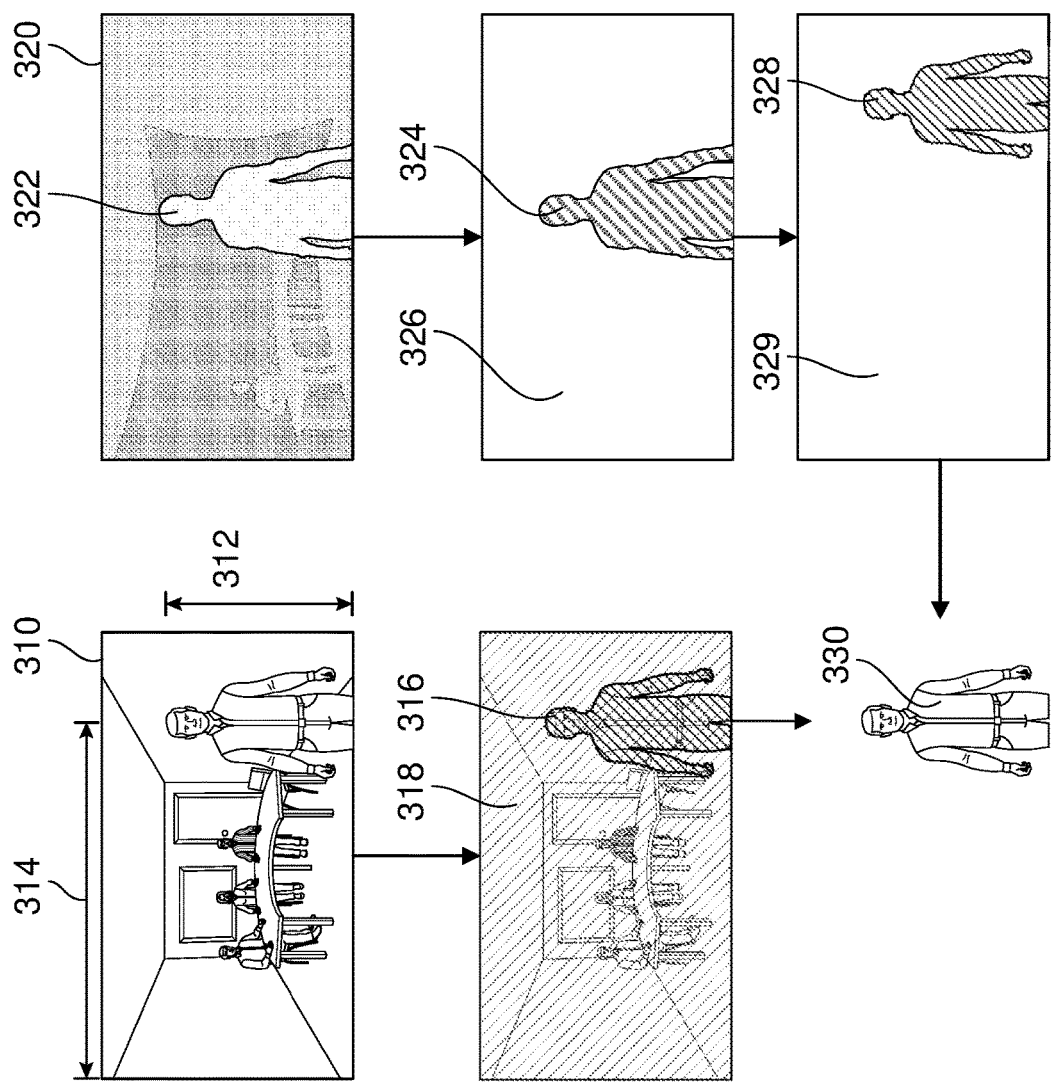
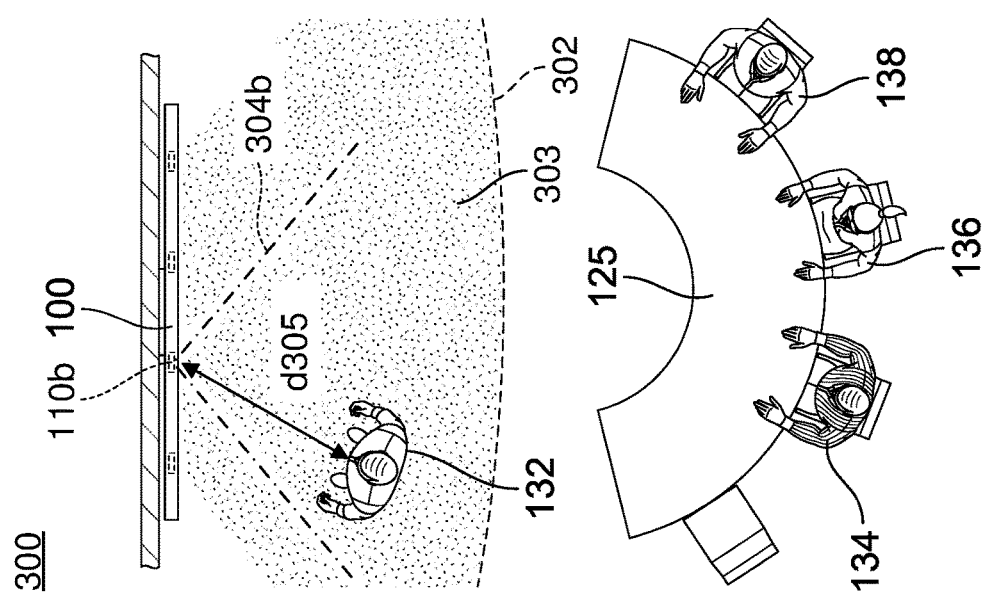
FIG. 3B
FIG. 3A

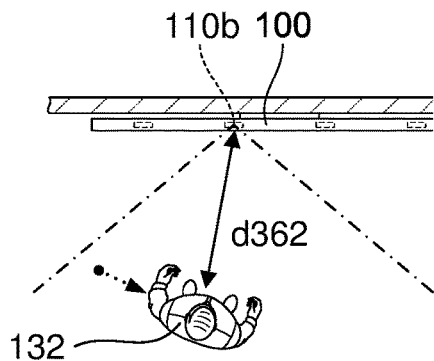
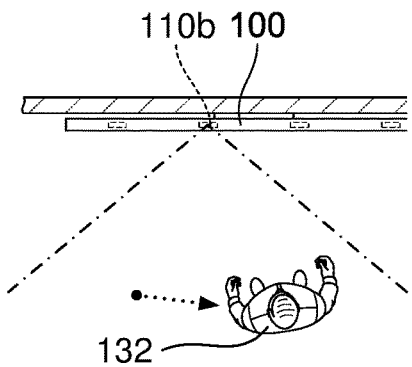
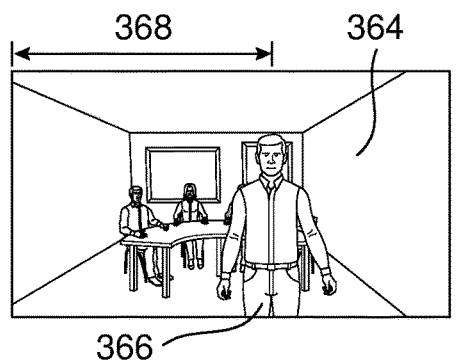
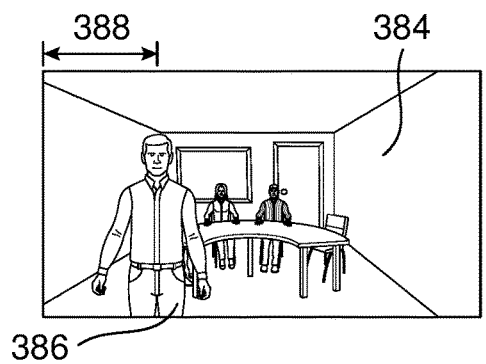
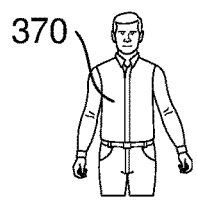
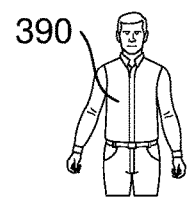
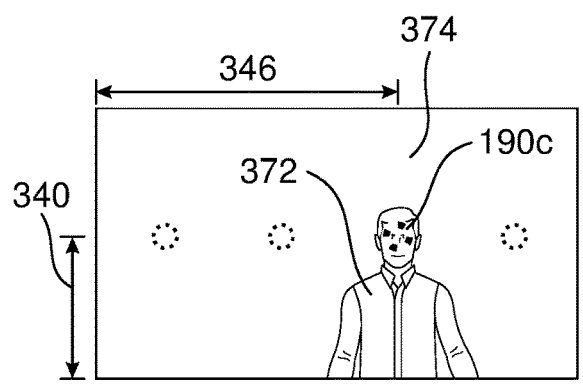
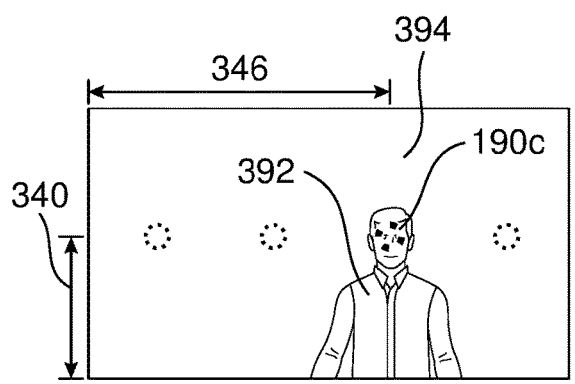
FIG. 3F        FIG. 3G

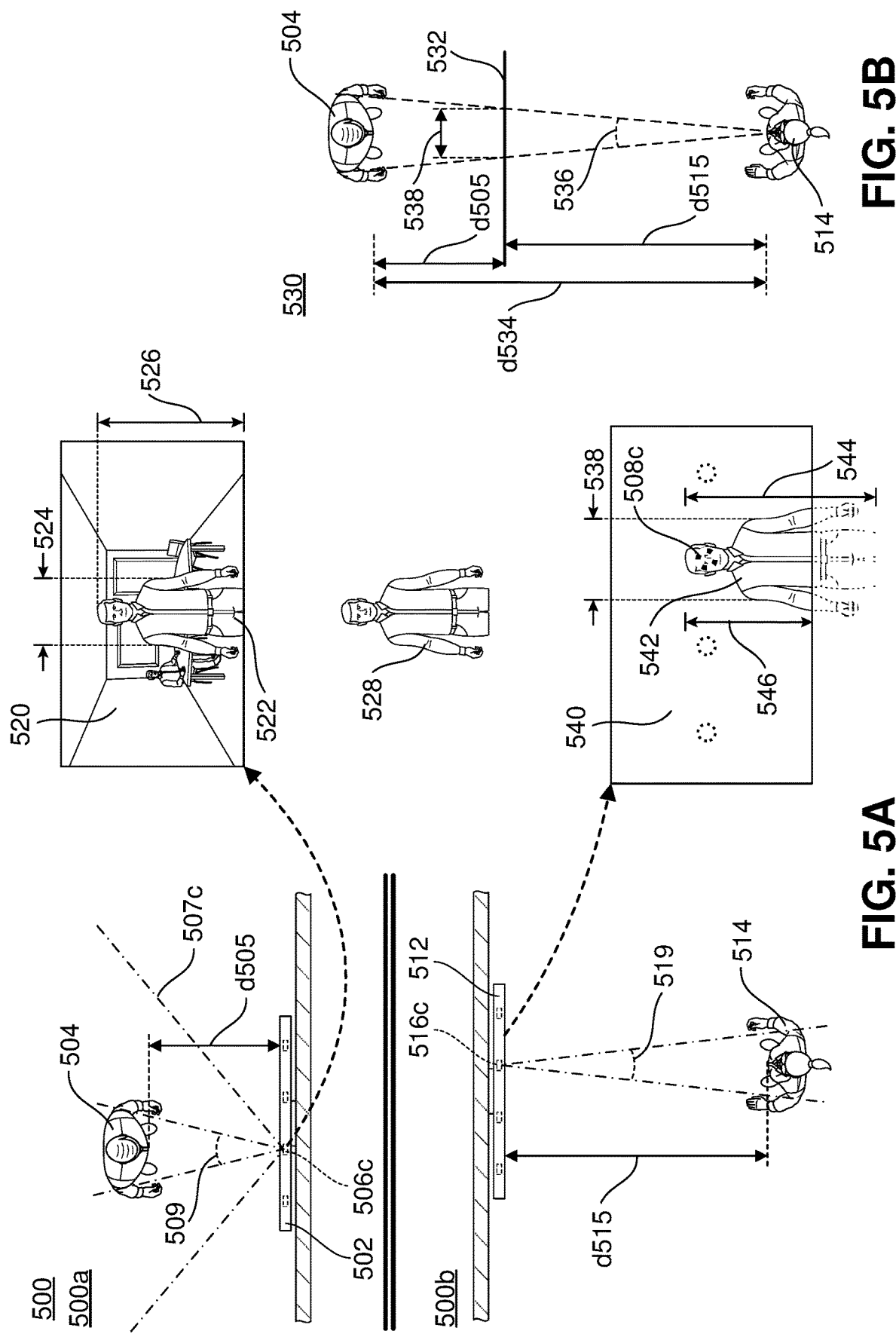

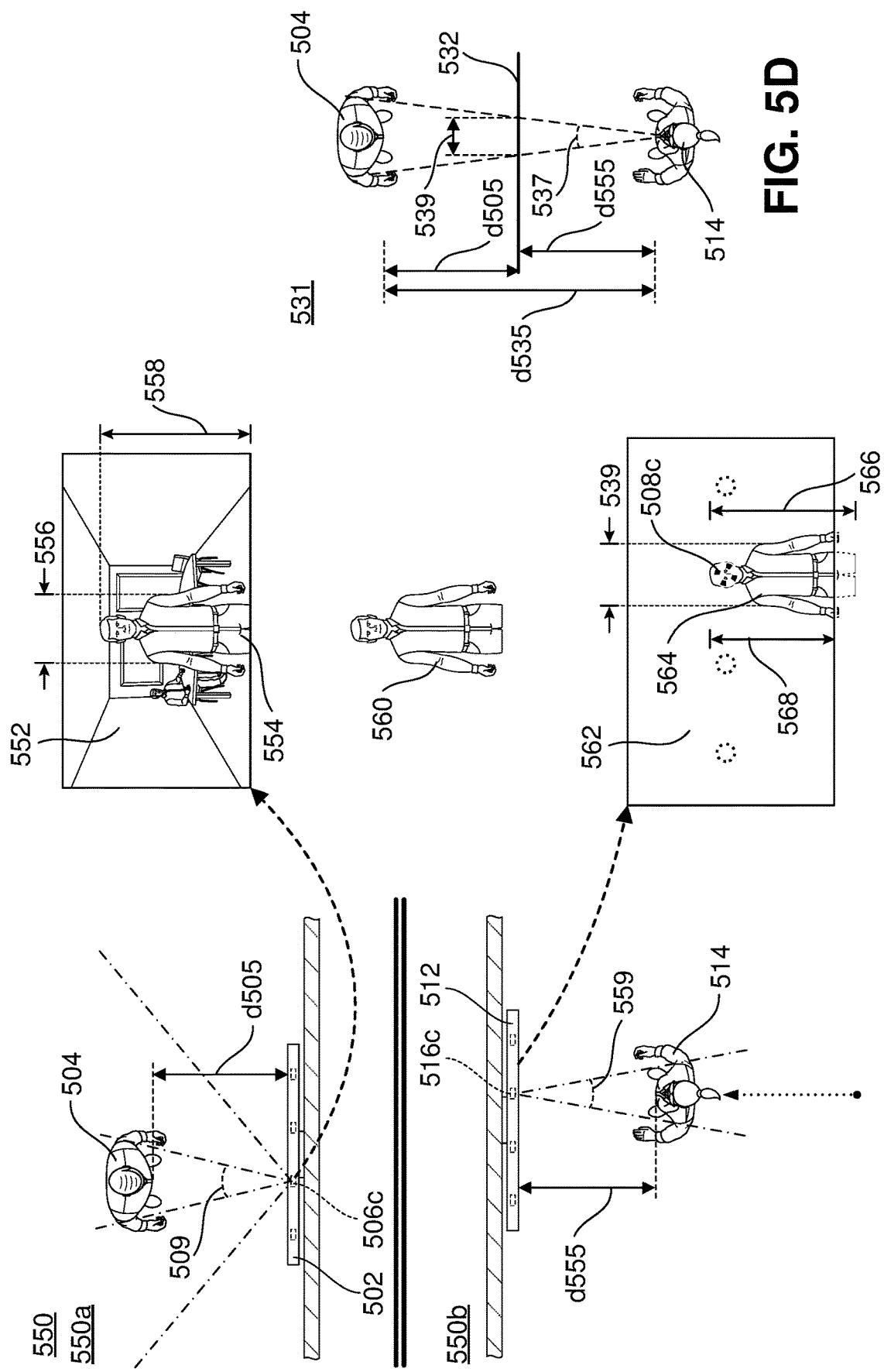

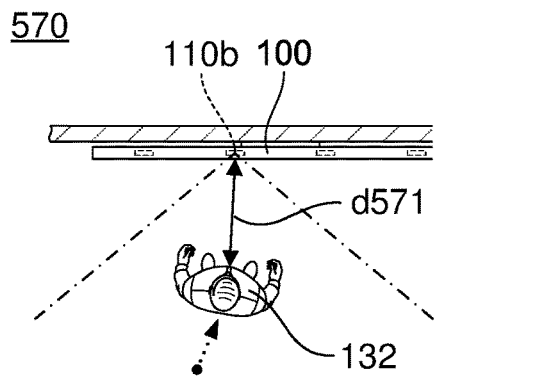
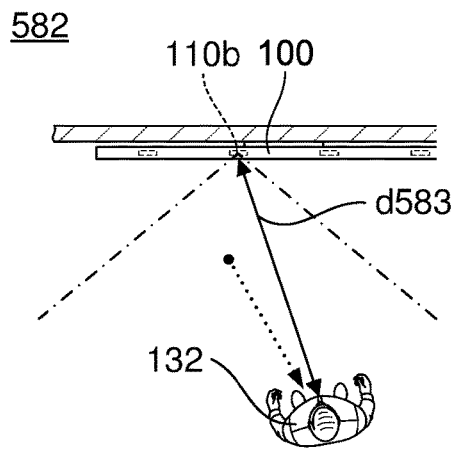
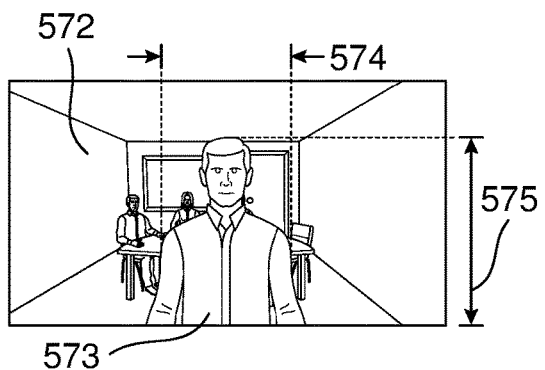
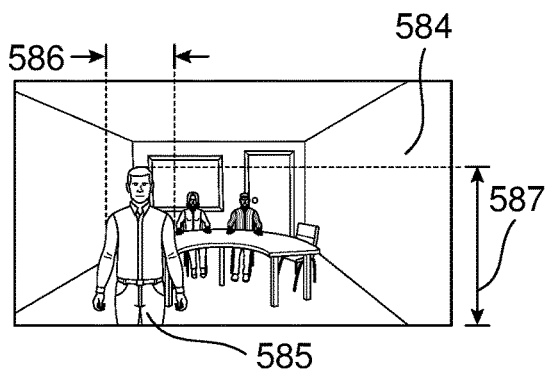
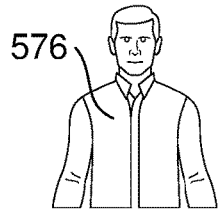
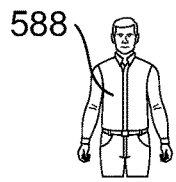
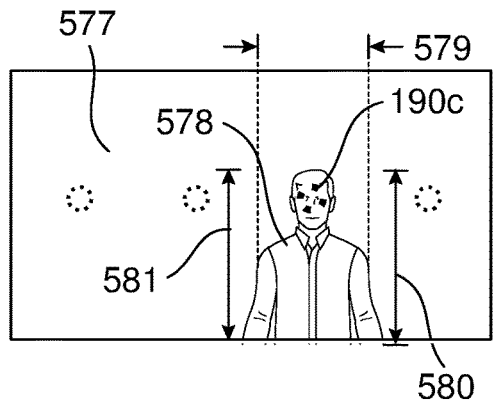
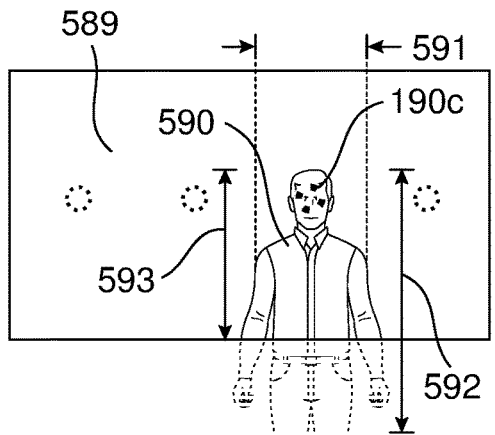
FIG. 5E  FIG. 5F

GAZE-CORRECT VIDEO CONFERENCING SYSTEMS AND METHODS

BACKGROUND

Video conferencing technologies have become increasingly commonplace. As globalization continues to spread throughout the world economy, it is increasingly common to find projects where team members are widely distributed across continents. Video conferencing has long been considered a critical technology to reduce high travel expenses for distributed work-forces.

During a teleconference or other video conferencing session, individuals may "interact" and engage in face-to-face conversations through images and sound captured by digital cameras and transmitted to participants. There is a growing reliance on such network-based video conferencing and video chat applications and services, such as Skype®, Google Chat®, and iChat®. Nevertheless, even with high end teleconferencing solutions face-to-face meeting is usually still a better experience than remote meetings.

In some cases, there may be video conferences where participants wish to move through their environment or otherwise change their physical position. A video conference session in which there is real-time variability in the physical position of participants(s) relative to a camera or to one another may preclude the capture of a consistent or reliable view of the participants(s) for the remote users. One of the factors that is known to be essential for face-to-face communication is eye contact. Eye contact can instill trust and foster an environment of collaboration and partnership. Lack of eye contact, on the other hand, may generate feelings of distrust and discomfort. Unfortunately, eye contact is usually not preserved in typical video conferencing. Although various techniques have been employed for improving the quality of video conferencing, there remain significant areas for new and improved ideas for capturing and presenting video in video conferencing sessions.

SUMMARY

A video conferencing system, in accord with a first aspect of this disclosure, includes a first device including a first display device and a first camera, one or more processors, and one or more computer readable media including instructions which, when executed by the one or more processors, cause the one or more processors to obtain a first RGB image captured, at a first time during a video conferencing session, by the first camera, wherein the first camera is positioned to capture the first RGB image through a first pixel display region of the first display device. The instructions also cause the one or more processors to receive at the first device, via the video conferencing session, a first video stream providing a first series of live images of a first human participant of the video conferencing session, wherein the first series of live images includes a first image portion depicting the eyes of the first human participant. In addition, the instructions cause the one or more processors to display, at about the first time, a first composite image on the first display device, wherein a first pixel position of the first composite image is displayed by the first pixel display region, the first pixel position having a first lateral pixel position in the first composite image. Furthermore, the instructions cause the one or more processors to, before the display of the first composite image, composite the first image portion at about the first lateral pixel position in the first composite image, segment a first foreground image, corresponding to a second human participant of the video conferencing session, from the first RGB image, cause, via the video conferencing session, a second composite image to be displayed by a second device at a different geographic location than the first device, wherein the second composite image includes the first foreground image composited with a first background image.

A method for video conferencing, in accord with a second aspect of this disclosure, includes obtaining a first RGB image captured, at a first time during a video conferencing session, by a first camera included in a first device, wherein the first camera is positioned to capture the first RGB image through a first pixel display region of a first display device included in the first device. The method also includes receiving at the first device, via the video conferencing session, a first video stream providing a first series of live images of a first human participant of the video conferencing session, wherein the first series of live images includes a first image portion depicting the eyes of the first human participant. In addition, the method includes displaying, at about the first time, a first composite image on the first display device, wherein a first pixel position of the first composite image is displayed by the first pixel display region, the first pixel position having a first lateral pixel position in the first composite image. The method further includes, before the display of the first composite image, compositing the first image portion at about the first lateral pixel position in the first composite image. In addition, the method involves segmenting a first foreground image, corresponding to a second human participant of the video conferencing session, from the first RGB image, and causing, via the video conferencing session, a second composite image to be displayed by a second device at a different geographic location than the first device, wherein the second composite image includes the first foreground image composited with a first background image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 3A illustrates an example of capturing and displaying human foreground subject images. FIG. 3B illustrates an example of segmentation of a foreground image from an RGB image captured by the multimedia communication device for the scene shown in FIG. 3A. FIG. 3F illustrates an example scene in which the foreground subject has moved laterally from the physical position in FIG. 3A and a resulting composite image for the scene in FIG. 3F. FIG. 3G illustrates an example scene in which the foreground subject has moved laterally from the physical position in FIG. 3F and a resulting composite image for the scene in FIG. 3G.

FIGS. 5A-5D illustrate techniques which may be applied by the video conferencing system in response to changes in distance between multimedia communication devices and respective foreground subjects. FIG. 5A illustrates a first scenario occurring at about a first time and a resulting composite image. FIG. 5B illustrates aspects of scaling of a foreground image by the video conferencing system for the composite image in FIG. 5A based on at least a distance between a multimedia communication device and a participant. FIG. 5C illustrates a second scenario occurring at about a second time after the first time in FIG. 5A in which a participant has moved closer to a multimedia communication device and a resulting composite image. FIG. 5D illustrates aspects of scaling of a foreground image by the video conferencing system for the second scenario shown in FIG. 5C.

FIGS. 5E and 5F illustrate additional techniques which may be applied by the video conferencing system in response to changes in distance between the first multimedia communication device and a foreground subject. FIG. 5E illustrates an example scene in which the foreground subject has moved from the physical position shown in FIG. 3F to a new physical position closer to the multimedia communication device and the resulting composite image. FIG. 5F illustrates an example scene in which the foreground subject has moved from the physical position shown in FIG. 5E to a new physical position further away from the multimedia communication device and the resulting composite image.

FIG. 6A illustrates a first scenario occurring at a first time, including a scene at the first geographic location shown in FIG. 1 and a scene at the second geographic location shown in FIG. 1. FIG. 6B illustrates a second scenario occurring at a second time after the first time shown in FIG. 6A and during the video conferencing session shown in FIG. 6A. FIG. 6C illustrates a third scenario occurring at a third time after the second time shown in FIG. 6B and during the video conferencing session shown in FIGS. 6A and 6B. FIG. 6D illustrates a fourth scenario occurring at a fourth time after the third time shown in FIG. 6C and during the video conferencing session shown in FIGS. 6A-6C.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. In the following material, indications of direction, such as "top" or "left," are merely to provide a frame of reference during the following discussion, and are not intended to indicate a required, desired, or intended orientation of the described articles unless expressly indicated.

The following implementations introduce video conferencing systems and process for facilitating eye contact between participants of a video conferencing session. These systems are configured to improve gaze alignment between live participants and projected images of remote counterparts. This can occur by generation of composite images that maximize the presentation of a participant's face and eyes. In addition, segmentation of the image allows foreground images to be composited with background images. These systems are configured to present images of the participant (s) such that the projected person appears to be looking directly at a camera. As a result, the participants can have a gaze-correct multi-party video conferencing session.

For purposes of this application, the terms "eye contact", "gaze alignment", or "direct gaze" refer to a situation in which two individuals are looking directly into each other's eyes, or where an image of a live person's eyes appear to be directed towards a person viewing the image, and/or a live person's eyes are directed toward the eyes of a projected image of a person. As noted above, eye gaze carries important information about another person's focus of attention, emotional and mental states, and intentions, as well as signals another person's potential interest for social interaction. Through eye contact, two persons share emotions and can more readily develop a connection. The perception of a direct gaze can trigger self-referential processing that leads, for example, to the enhanced processing of incoming information, enhancement of self-awareness, and increased prosocial behavior. The eye region is a key region of the face that individuals tend to pay attention to during conversations, as shown in multiple studies using eye tracking technology. In addition, a direct gaze can hold an audience's attention more effectively than other gaze directions. Thus, it becomes increasingly important to provide video conference participants with reliable systems and processes by which they may maintain consistent eye contact during virtual meetings.

Figure 1:
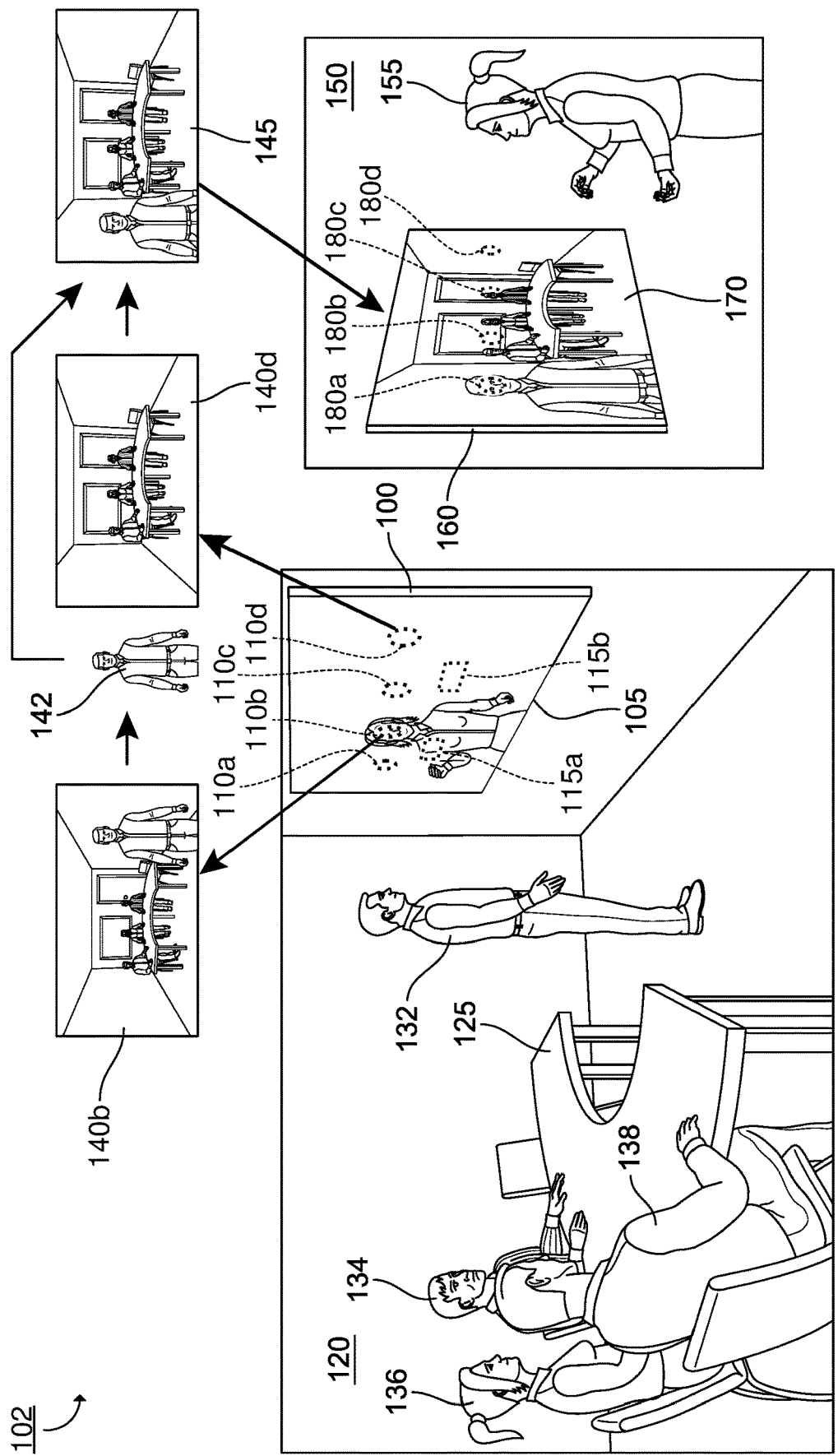
FIG. 1 illustrates an example of a video conferencing system that includes a first multimedia communication device multimedia communication device being used to access and participate in a video conferencing session.

FIG. 1 illustrates an example of a video conferencing system 102 that includes a first multimedia communication device 100 (which may be referred to as a "teleconferencing device," "telepresence device", "video conferencing device," or "participant device") being used to access and participate in a video conferencing session (which may be referred to as a "telepresence session"). The video conferencing system 102 further includes a second multimedia communication device 160 at a different second geographic location 150. For convenience of discussion, the second multimedia communication device 160 is configured with essentially the same features and to operate substantially the same as the first multimedia communication device 100. However, the multimedia communication devices 100 and 160 may be each implemented in various other embodiments. In some examples, the video conferencing system 102 may include additional such multimedia communication devices, which may be used to access and participate in the video conferencing session shown in FIG. 1 and/or other video conferencing sessions. In some examples, the video conferencing system 102 may include and/or make use of additional network-connected computing devices and systems, with the video conferencing system 102 being configured to use such additional computing devices and systems for establishing video conferencing sessions, maintaining video conferencing sessions, image segmentation, and/or image compositing.

In FIG. 1, the first multimedia communication device 100 is arranged and operating at a first geographic location 120 as an endpoint in a video conferencing session. A video conferencing session may also be referred to as a "video conference." During the video conferencing session, the first multimedia communication device 100 is operating to provide a video stream providing a series of live images depicting one or more participants (which may be referred to as "subjects" or "users") at the first geographic location 120 to the second multimedia communication device 160 for viewing by a remote participant 155. Further, the first multimedia communication device 100 is operating to receive a video stream from the second multimedia communication device 160 providing a series of live images depicting the remote participant 155. In the example illustrated in FIG. 1, the first multimedia communication device 100 may be referred to as a "local" device, and the second multimedia communication device 160 may be referred to as a "remote" device.

In the examples illustrated in FIGS. 1-3, 5-7, and 9, the multimedia communication device 100 is embodied as an interactive device that includes a display device 105 for presenting images, although it is noted that the multimedia communication device 100 is not limited to such embodiments. For example, in some implementations, the multimedia communication device 100 may present images via, but not include, a display device. In FIG. 1, the display device 105 is positioned to present images to participants at the first geographic location 120. In some examples, the multimedia communication device 100 may be configured to display images and/or video streams from one or more remote devices or systems participating in a video conferencing session with the multimedia communication device 100, such as from the multimedia communication device 160. For example, the multimedia communication device 100 may be mounted on a wall, as illustrated in FIG. 1, or on a stand (which may be movable). In some examples, the display device 105 is also configured to operate as a touch screen to receive user input. In this example, the first geographic location 120 is a conference room with seated participants 134, 136, and 138 at a table 125 and a standing participant 132 in closer proximity to the multimedia communication device 100. The example illustrated in FIG. 1 is not intended to limit applications or environments in which the multimedia communication device 100 may be used. Also, in order to more compactly illustrate features of the first geographic location 120, the desk 125 is shown closer in FIG. 1 than in FIG. 3 below.

At the time illustrated in FIG. 1, the four participants 132, 134, 136, and 138 are participating in the video conferencing session via the multimedia communication device 100. The term "video conferencing" applies to electronic communications in which a video stream including images captured by a first participant device is received and displayed by at least a second participant device, and may include, but does not require, the first participant device displaying a video stream provided by the second participant device. The illustrated video conferencing session includes the remote participant 155 at the second geographic location 150, who is participating via the multimedia communication device 160 (which may also be referred to as a "remote participant device") configured to serve as an endpoint in the video conferencing session. The multimedia communication device 160 receives the video stream via one or more data communication networks (not illustrated in FIG. 1). It is noted that use of the multimedia communication device 100 is not necessarily limited to video conferencing activities. For example, the multimedia communication device 100 may provide a virtual whiteboard or run arbitrary computer program applications, and display information and/or user interfaces for such other activities on the display device 105. Such other activities may be performed during a video conferencing session and result in additional data being exchanged among devices participating in a video conferencing session.

The multimedia communication device 100 includes a plurality of RGB (red-green-blue) imaging cameras 110a, 110b, 110c, and 110d (collectively referred to as "RGB cameras 110"). Although the example illustrated in FIG. 1 includes four RGB cameras 110, in other implementations there may two or more RGB cameras 110. Each of the RGB cameras 110 are positioned behind the display device 105 to capture images from light received through the display device 105, and accordingly are not directly visible in FIG. 1. By positioning the RGB cameras 110 behind the display device 105, images can be displayed on the display device 105 over the physical positions of the RGB cameras 110. By placing the RGB cameras 110 behind the display device 105, subject gazes may be directed at the RGB cameras 110, enabling gaze-correct multi-party video conferencing as discussed in more detail herein. Additionally, by placing the RGB cameras 110 behind the display device 105, greater numbers of RGB cameras 110 may be more easily included, the RGB cameras 110 may arranged to capture images from more natural angles (for example, for near and/or far features), and an additional non-display user-facing surface (such as a bezel) is not necessary to accommodate the RGB cameras 110.

In some implementations, as illustrated by the examples in FIGS. 1-3 and 5-10, the RGB cameras 110 are positioned such that, when the multimedia communication device 100 is operated, a leftmost RGB camera 110 (in FIG. 1, the RGB camera 110a) and a rightmost RGB camera 110 (in FIG. 1, the RGB camera 110d) span a horizontal distance that is at least large enough, in most conditions, to obtain a view around a human subject located close to and within a field of view (FOV) of one or more of the RGB cameras 110. For example, in FIG. 1, an image of the standing participant 132 is included in an image 140b captured by the RGB camera 110b, whereas the standing participant 132 is not visible in an image 140d captured by the RGB camera 110d at approximately the same time. In some examples, the RGB camera 110a may be positioned at a height less than or about equal to a height of the RGB camera 110d. Various other arrangements and numbers for the RGB cameras 110 are also effective, such as, but not limited to, an array, along multiple parallel lines, or along perpendicular lines (for example, to increase a horizontal span when operated in portrait orientation perpendicular to the landscape orientation illustrated in FIG. 1). In some implementations, the RGB cameras 110 are configured and operated to periodically capture images at a frame rate suitable for video conferencing. The multimedia communication device 160 similarly includes RGB cameras 180a, 180b, 180c, and 180d.

In some implementations, the multimedia communication device 100 includes one or more depth cameras 115, such as the two depth cameras 115a and 115b. In some examples, some or all of the depth cameras 115 are positioned behind the display device 105 to capture light for depth estimation through the display device 105, such as is illustrated for the two depth cameras 115a and 115b (which accordingly are not directly visible in FIG. 1). By placing the depth cameras 115 behind the display device 105, greater numbers of depth cameras 115 may be more easily included, and an additional non-display user-facing surface is not necessary for the depth cameras 115. A depth estimate may also be referred to as an "estimated depth," "distance estimate," or "estimated distance." In some implementations, the depth cameras 115 produce depth maps (also referred to as "depth images") that include depth estimates for multiple physical positions within the FOV of the depth cameras 115. Depth estimates obtained using the depth cameras 115 may be used by the video conferencing system 102 (for example, at the multimedia communication device 100) to, among other things, determine when a subject has come into proximity to the multimedia communication device 100, estimate a distance between the multimedia communication device 100 and a subject, estimate a physical position of a subject relative to one or more of the RGB cameras 110, and/or identify discontinuities in a depth image and related depth image data used to aid image segmentation for a foreground subject in an image captured by one of the RGB cameras 110.

As will be described in more detail below, the video conferencing system 102 (for example, the multimedia communication device 100) is configured to select one or more foreground cameras from the multiple RGB cameras 110 for capturing one or more images of one or more identified foreground subjects (for example, a human subject). The term "foreground" may be abbreviated as "FG" in portions of this disclosure. For the discussion of FIG. 1, the standing participant 132 may also be referred to as "foreground subject 132." In the example shown in FIG. 1, the RGB camera 110b has been selected as a foreground camera, and has captured an RGB image 140b in which the foreground subject 132 can be seen. Image segmentation is performed to identify a foreground image portion of the RGB image 140b corresponding to the foreground subject 132, which is used to generate a foreground image 142 of the foreground subject 132.

In some implementations, the video conferencing system 102 (for example, the multimedia communication device 100) is configured to select a background camera from the multiple RGB cameras 110 for capturing one or more images of at least a portion of a background area behind the foreground subject 132. The term "background" may be abbreviated as "BG" in portions of this disclosure. In the example shown in FIG. 1, the RGB camera 110d has been selected as a background camera, and a background image 140d has been obtained from the selected RGB camera 110d. In this particular example, the background image 140a includes images of the table 125 and the participants 134, 136, and 138, but does not show the foreground subject 132. Various techniques and details for dynamically selecting RGB cameras to capture foreground subject images and/or background images, segmenting foreground images, and producing composite images from the foreground images are described in U.S. patent application Ser. No. 15/835,413 (filed on Dec. 7, 2017 and entitled "Video Capture Systems and Methods"), which is incorporated by reference herein in its entirety.

In the example shown in FIG. 1, the foreground image 142 has been scaled and composited with the background image 140d to produce a composite image 145. The scaled foreground image 142 has been positioned in the composite image 145 so that when the composite image 145 is displayed by the multimedia communication device 160, an image portion depicting the eyes of the foreground subject 132 is shown at about the position of the RGB camera 180a. As a result, while the participant 155 views the composite image 145 on the multimedia communication device 160 (and other such images), in RGB images captured by the RGB camera 180a the participant 155 is looking directly at the RGB camera 180a. When such RGB images are used to generate images of the participant 155 on the multimedia communication device 100, it appears to at least some of the participant at the first geographic location 120 that they are in direct eye contact with the participant 155. In the example of FIG. 1, an image portion depicting the eyes of the participant 155 is shown at about the position of the RGB camera 110b used as a foreground camera for the foreground subject 132. As a result, while the foreground subject 132 views such images of the participant 155 on the multimedia communication device 100, in RGB images captured by the RGB camera 110b the foreground subject 132 is looking directly at the RGB camera 110b.

With the use of such RGB images, the participant 155 views images of the participant 132 in which the participant 132 is in eye contact with the participant 155, and the participant 132 views images of the participant 155 in which the participant 155 is in eye contact with the participant 132. As a result, the participants 132 and 155 have a gaze-correct multi-party video conferencing session. Additionally, since the participants 132 and 155 are actually looking at the RGB cameras 110 and 180, there is no need to modify the portions of the RGB images depicting the eyes to achieve gaze alignment, thereby avoiding application of gaze correction techniques that generally result in unnatural images.

For delivery to remote devices such as the multimedia communication device 160, the composite image 145 and/or the foreground image 142 is digitally encoded by the video conferencing system 102 to produce an encoded image (such as, but not limited to, a frame of an encoded video stream). The encoded image is then provided to the remote multimedia communication device 160, thereby causing the composite image 145 to be displayed, at least in part, by the remote multimedia communication device 160, such as via a video conferencing application program executed by the remote multimedia communication device 160. Similar processing may be performed to generate a sequence of multiple such images, based on images captured by the RGB cameras 110, used for a sequence of frames that are encoded in one or more video streams transmitted to participants of the video conferencing session. Although in FIG. 1 the image 170 is illustrated as occupying an entire display surface of the remote device 160, the image 170 may be displayed in a subportion of the display surface; for example, the image 170 may be displayed in a window or a video display region of a user interface. The multimedia communication device 100 and/or the multimedia communication device 160 may display images received from one or more remote devices in a similar manner.

Figure 2:
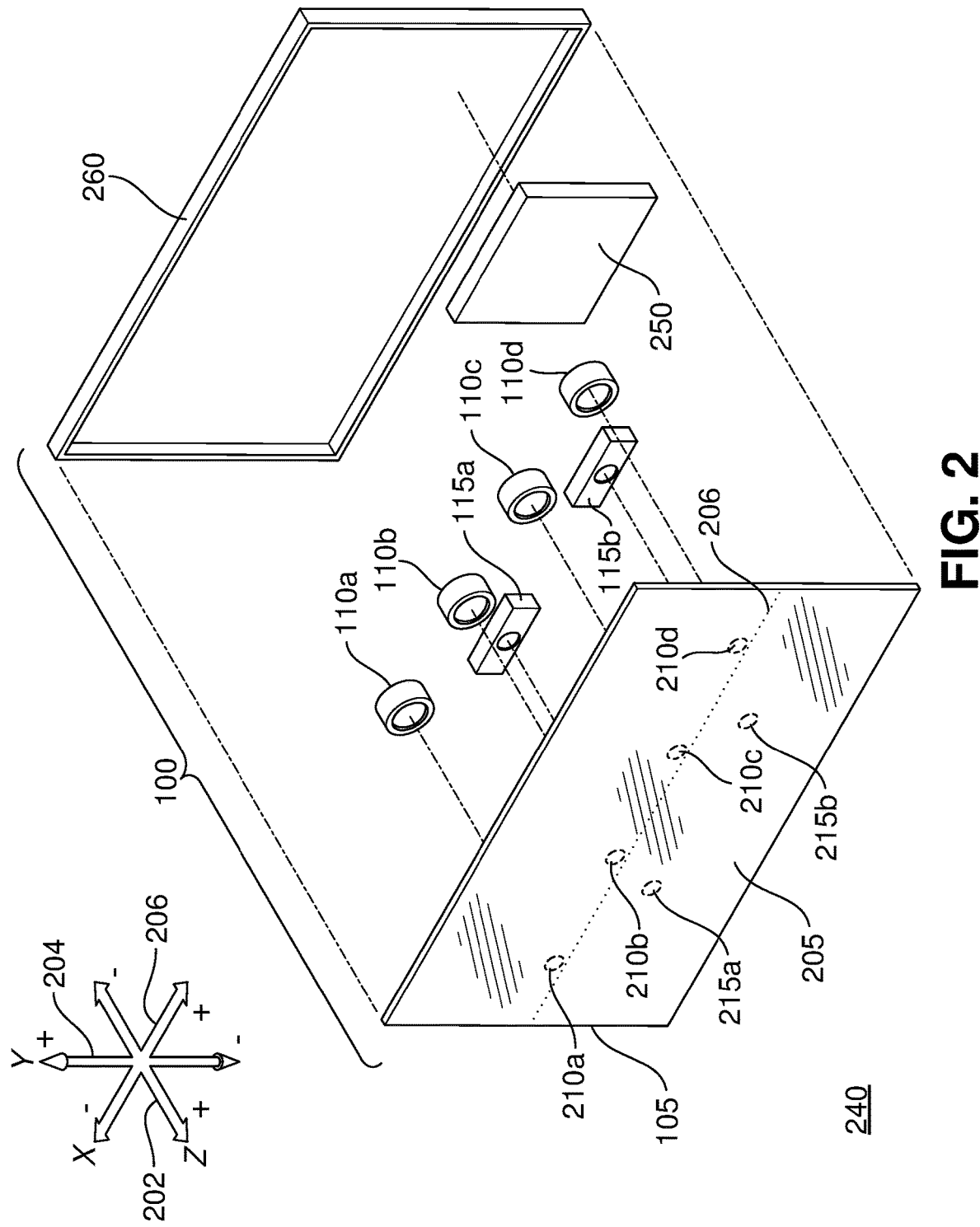
FIG. 2 illustrates an exploded view of the first multimedia communication device illustrated in FIG. 1.

FIG. 2 illustrates an exploded view of the first multimedia communication device 100 illustrated in FIG. 1. For purposes of clarity and discussion, FIG. 2 is presented with reference to a Z axis 202, a Y axis 204, and an X axis 206. With respect to the Z axis 202, a positive direction (illustrated with "+") may be referred to as a "forward" direction, and a negative direction (illustrated with "−") may be referred to as a "backward" direction. The display device 105 is arranged perpendicular to the Z axis 202 and configured to emit light in the forward direction through a front (and user-viewable) surface 205 of the display device 105 (which also, in this example, is a front surface 205 of the first multimedia communication device 100) in response to signals received from a controller 250 included in the first multimedia communication device 100. In some examples, a horizontally arranged axis of the first multimedia communication device 100 may be referred to as a lateral axis or, and a vertically arranged axis of the first multimedia communication device 100 may be referred to as a longitudinal axis or direction (which may define an "upward" direction and a "downward" direction). For example, in the landscape orientation shown in FIG. 1, the X axis 206 may be referred to as a lateral axis and the Y axis 204 may be referred to as a longitudinal axis. In another example, where the first multimedia communication device 100 is rotated about the Z axis 202 by about 90 degrees, the X axis 206 may be referred to as a longitudinal axis and the Y axis 204 may be referred to as a lateral axis.

The display device 105 may be implemented with technologies such as liquid-crystal displays (LCDs), organic light-emitting diode type displays (OLEDs), quantum dot-based displays, or various other light-emitting displays that permit RGB cameras 110 to capture suitable images through the display device 105. Light received by the RGB cameras 110a, 110b, 110c, and 110d from a scene 240 in front of the display device 105 passes through respective pixel display regions 210a, 210b, 210c, and 210d of the display device 105 (collectively referred to as "pixel display regions 210", which may also be referred to as "RGB camera pixel display regions"). Light received by the depth cameras 115a and 115b from the scene 240 passes through respective pixel display regions 215a and 215b of the display device 105 (collectively referred to as "pixel display regions 215", which may also be referred to as "depth camera pixel display regions"). One or more scene illumination sources (not illustrated in FIG. 2) may also be positioned behind the display device 105. For example, one or more of the depth cameras 215 may include an integrated infrared (IR) illumination source. In some examples, the display device 105 includes multiple display panels.

Various configurations may be used to allow the RGB cameras 110 to capture images through the display device 105. In some implementations, the display device 105 is a forward-emitting display device, such as an OLED-based forward-emitting display device, arranged such that a small portion or substantially none of the light emitted by the display device 105 is emitted through a rear surface of the display device 105. For example, some OLED-based forward-emitting display devices have about a 5% backward emission of display light. In some implementations, image correction is performed to correct for backward-emitted light; for example, image contents for an RGB camera pixel display region 210 may be used to estimate and subtract or otherwise correct the effect of backward-emitted light captured by an RGB camera 110. With a forward-emitting display device 105, the RGB cameras 110 and/or the depth cameras 115 may capture images at any time, independent of synchronization with operation of the display device 105.

In some implementations, image capture operations performed by the RGB cameras 110 are synchronized with at least operation of their respective pixel display regions 210. For example, image capture periods for an RGB camera 110 may be performed when its respective pixel display regions 210 is not emitting light, such as, but not limited to, in synchronization with display refresh periods or by displaying a dimmed image (including, for example, a black image) in the pixel display regions 210 during image capture operations. Additional approaches are described in U.S. Patent Application Publication Number 2015/0341593 (published on Nov. 26, 2015 and entitled "Imaging Through a Display device"), which is incorporated by reference herein in its entirety. In some implementations, depth image capture operations performed by the depth cameras 115 are similarly synchronized with at least operation of their respective depth camera pixel display regions 215. In the example of the first multimedia communication device 100 in FIGS. 1 and 2, each of the RGB cameras 110 is positioned at about a same first distance upward (and away) from a lateral midline 206 of the display device 105. However, in other implementations, the physical positions of the RGB cameras 110 relative to one another and/or the lateral midline 206 can vary.

Figure 11:
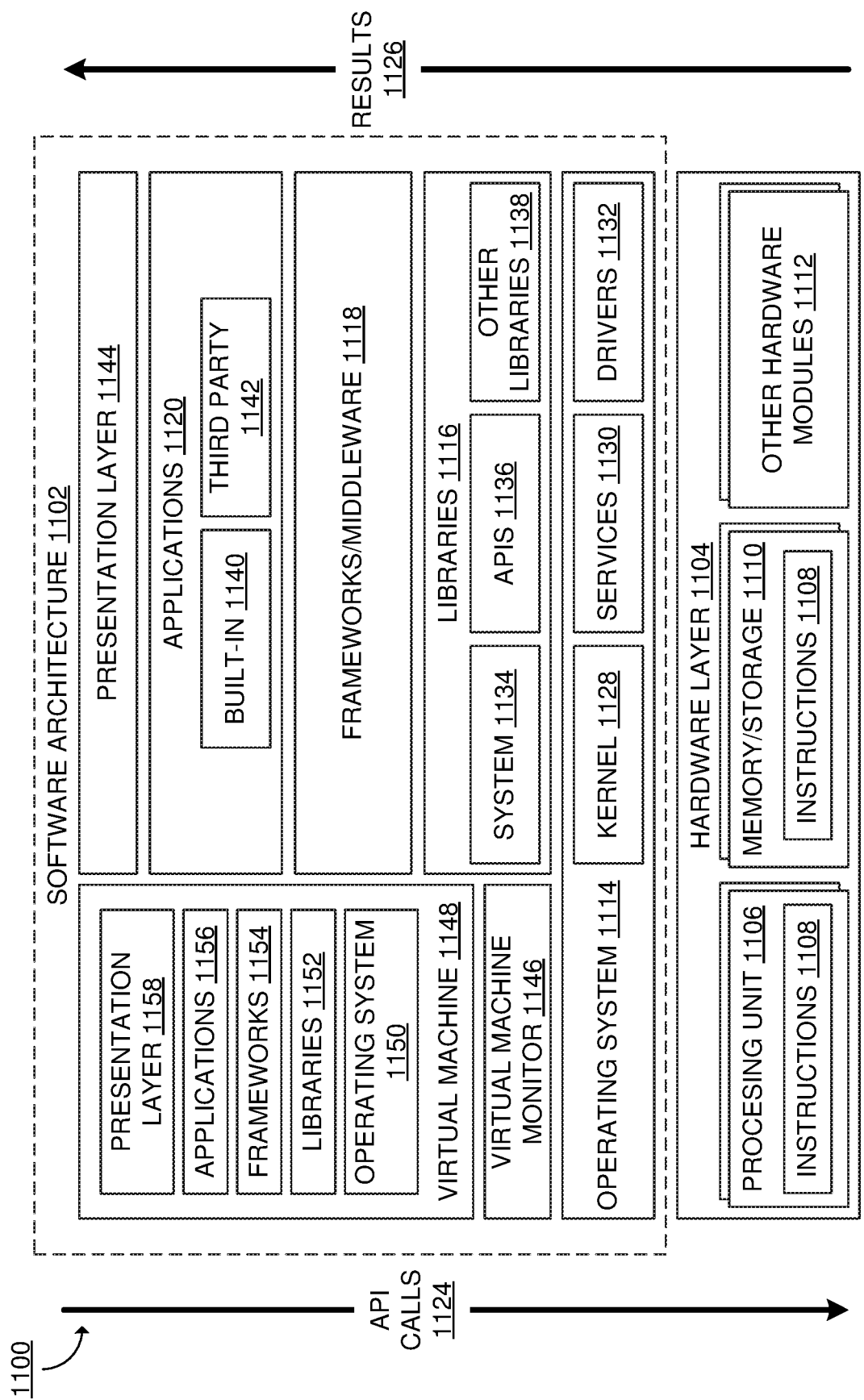
FIG. 11 is a block diagram illustrating an example software architecture, various portions of which may be used in conjunction with various hardware architectures herein described.
Figure 12:
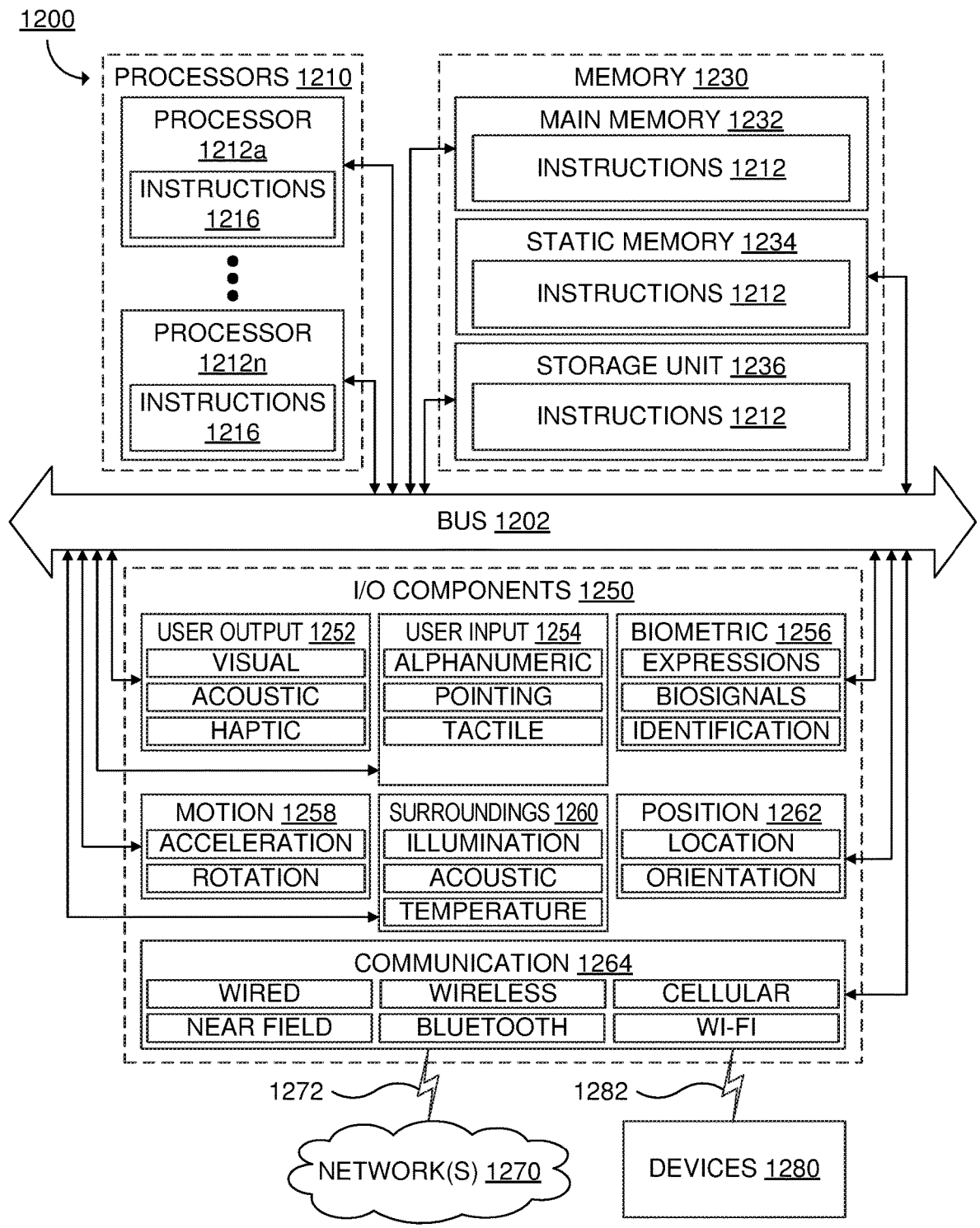
FIG. 12 is a block diagram illustrating components of an example machine configured to read instructions from a machine-readable medium and perform any of the features described herein.

The first multimedia communication device 100 also includes the controller 250. The controller 250 includes a logic subsystem, a data holding subsystem, a display controller, and a communications subsystem, and is communicatively coupled to the display device 105, RGB cameras 110, and depth cameras 115. The logic subsystem may include, for example, one or more processors configured to execute instructions and communicate with the other elements of the first multimedia communication device 100 according to such instructions to realize various aspects of this disclosure. Such aspects include, but are not limited to, configuring and controlling the other elements of the first multimedia communication device 100, input and commands, communicating with other computer systems, processing images captured by the RGB cameras 110 and the depth cameras 115, and/or displaying image data received from remote systems. The data holding subsystem includes one or more memory devices (such as, but not limited to, DRAM devices) and/or one or more storage devices (such as, but not limited to, flash memory devices). The data holding subsystem includes one or more media having instructions stored thereon which are executable by the logic subsystem, which cause the logic subsystem to realize various aspects of this disclosure. Such instructions may be included as part of firmware, an operating system, device drivers, application programs, or other executable programs. The communications subsystem is arranged to allow the first multimedia communication device 100 to communicate with other computer systems. Such communication may be performed via, for example, wired or wireless data communication. Other examples for the controller 250 are illustrated in FIGS. 11 and 12.

The first multimedia communication device 100 also includes an enclosure 260, arranged to be mechanically coupled to the display panel 105 and enclose internal components of the first multimedia communication device 100, including the RGB cameras 110, the depth cameras 215, and the controller 250. The enclosure 260 may also be referred to as a "housing." In this example, when the illustrated first multimedia communication device 100 is assembled, the RGB cameras 110 are all encompassed by the single enclosure 260 and positioned behind the single display device 105.

For the examples shown in FIGS. 1-7, 9, and 10, the display device 105 has a 16:9 aspect ratio, with a diagonal size of approximately 213 centimeters. The RGB cameras 110a, 110b, 110c, and 110d are positioned equidistantly along a line substantially parallel to the lateral axis 206 with a distance of about 150 centimeters between the optical axes of the RGB cameras 110a and 110d. A lateral midline of the display device 105 (for example, the lateral midline 206 illustrated in FIG. 2) is positioned horizontally and approximately 154 centimeters above a floor, and the optical axes of the RGB cameras 110 are positioned approximately 6 centimeters above the vertical center of the display device 105, placing the optical axes of the RGB cameras 110 approximately 160 centimeters from the floor, positioning the RGB cameras 110 at approximately eye level for a standing human subject. By positioning the RGB cameras 110 at an eye-level height, a subject's eyes are more likely to be aligned with the RGB cameras 110 improving both capture of gaze-aligned images (images in which a subject is looking directly at the camera) and display of images of remote participants perceived as direct eye-to-eye contact. An optical axis of the depth camera 115a is oriented 11 degrees left from the horizontal axis 210 and an optical axis of the depth camera 115b is oriented 11 degrees right from the horizontal axis 210, thereby providing an increased combined FOV for the depth cameras 115. An optical center of the depth camera 115a is positioned approximately 66 centimeters in the lateral direction from an optical center of the depth camera 215b. The optical centers of the depth cameras 115 are positioned approximately 13 centimeters below the optical axes of the RGB cameras 110. The RGB cameras 110 and the depth cameras 115 each capture images with a 16:9 aspect ratio and with a horizontal FOV of approximately 100 degrees. These dimensions and arrangements are described to more fully describe the illustrations in FIGS. 1-7, 9, and 10, and are not required features of the examples described herein.

Although in FIGS. 1 and 2 various elements and features of the first multimedia communication device 100 are described as being integrated into a single device, in other implementations, various elements and features of the first multimedia communication device 100 may be implemented across multiple devices. For example, selected operations may be performed by a computer system not within the illustrated enclosure 260, and/or some or all of the depth cameras 115 may be included in one or more separate devices instead of being positioned behind the display device 105 or otherwise not positioned within the enclosure 260.

FIG. 3A illustrates an example of capturing and displaying human foreground subject images. FIG. 3A shows a top view of an example scene 300 in which the four participants 132, 134, 136, and 138 are arranged much as shown in FIG. 1, with seated participants 134, 136, and 138, and standing participant 132, during a video conferencing session. The standing participant 132 has advanced toward the multimedia communication device 100 and within an example threshold distance 302 and a corresponding foreground space 303. The video conferencing system 102 (for example, the multimedia communication device 100) may be configured to determine a subject distance based on depth images captured by the depth cameras 115. In this example, the video conferencing system 102 is configured to ignore features beyond the threshold distance 302 or outside of the foreground space 303 for identifying foreground subjects. The shape, physical positions, and distances illustrated in FIG. 3A for the threshold distance 302 and the foreground space 303 are generally illustrated for discussion, and may be different in various implementations. In some implementations, the threshold distance 302 and/or a shape of, and physical positions for, the foreground space 303 may be defined and/or adjusted by a user; for example, during a setup process.

Based on at least the participant 132 being within the threshold distance 302, the video conferencing system 102 (for example, the multimedia communication device 100) has identified the participant 132 as a foreground subject for segmentation from RGB images. In FIG. 3A, the video conferencing system 102 has selected the RGB camera 110b, with a corresponding FOV 304b (shown in part), as the foreground camera for capturing images of the foreground subject 132. It is noted that foreground camera selection may occur after the foreground image has been captured and be based on the content of the RGB images and/or corresponding depth images.

FIG. 3B illustrates an example of segmentation of a foreground image 330, corresponding to the foreground subject 132, from an RGB image 310 captured by the multimedia communication device 100 for the scene 300 shown in FIG. 3A. In some implementations, the segmentation of a foreground image from an RGB image results in labeling of pixels in the RGB image, rather than generating a foreground image separate from the RGB image. The RGB image 310 has been captured by the selected foreground RGB camera 110b. In the RGB image 310, the foreground subject 132 has a height 312 of about 74% of the height of the RGB image 310, and the eyes of the foreground subject 132 are centered at a lateral distance 314 of about 74% of the width of the RGB image 310. In this example, an RGB image based segmentation is performed, identifying a first foreground mask 316 identifying pixel positions corresponding to the foreground subject 132 and, in some examples, a first background mask 318. In some examples, a machine-trained model for an automated machine algorithm, trained to identify instances of certain types of objects, may be applied to the RGB image 310 to identify the first foreground mask 316 and/or the first background mask 318. For example, a trained neural network, such as a trained convolutional neural network (CNN), may be used for this purpose.

At about a same time as the capture of the RGB image 310, a depth image 320 has been captured for the scene 300 by the depth camera 115a. Due to limitations of patent illustrations, the depth image 320 is illustrated with only a few different levels of shading. In the depth image 320, there is a portion 322 with depth estimates that are substantially discontinuous along edges between the portion 322 and surrounding areas of the depth image 320. Based on the depth image 320, the video conferencing system 102 (for example, the multimedia communication device 100) identifies a first foreground depth mask 324 identifying positions in the depth image 320 corresponding to the foreground subject 132 and, in some examples, a first background depth mask 326. In some implementations, based on the above-mentioned discontinuities between the portion 322 and surrounding areas of the depth image 320, the video conferencing system 102 identifies the portion 322 as a foreground portion 322 of the depth image 320. In some examples, the video conferencing system 102 may further determine a distance d305 and/or physical position for the identified foreground portion 322. Based on, for example, the determined distance d305 being less than the threshold distance 302 and/or the determined physical position being within the foreground space 303, the video conferencing system 102 identifies a foreground subject corresponding to the participant 132.

In an implementation with the depth camera 115a is at a different position than the imaging camera 110b, as illustrated in FIGS. 1 and 2), the video conferencing system 102 (for example, the multimedia communication device 100) is configured to identify portions of the RGB image 310 corresponding to the first foreground depth mask 324, resulting in a second foreground mask 328 and, in some implementations, a second background mask 329. For conversions, transformations, and/or other computations performed to identify the corresponding positions in the RGB image 310, various techniques can be used individually or in combination, including, but not limited to, rotations and/or translations of two-dimensional (2D) and/or 3D points and/or vectors (including, for example, use or one or more transformation matrices); optical distortion correction for a depth camera and/or RGB camera (including, for example, correction of complex asymmetric optical distortion); geometric transformations such as, but are not limited to, affine transformations (linear conformal (scaling, translations, rotations) and shears), projective transformations (projections, homographies, and collineations), and piecewise linear transformations (for example, affine transformations applied separately to triangular regions of an image); and/or nonlinear image transformations such as, but not limited to, polynomial transformations, nonuniform scaling, circular or radial distortion (barrel, pincushion, moustache, and multi-order), and tangential distortion (for example, using Brown's model). Such techniques may be implemented using various techniques, such as, but not limited to, matrix operations, numerical approximation (such as Taylor series or Newton-Raphson), and/or mapping/interpolation.

The video conferencing system 102 (for example, the multimedia communication device 100) is configured to, based on the first foreground mask 316, the second foreground mask 328, the first background mask 318, and/or the second background mask 329, segment from the RGB image 310 a foreground image 330 corresponding to the foreground subject 132. Other techniques that may be applied for segmenting the foreground image 330 are described in U.S. patent application Ser. No. 15/975,640 (filed on May 9, 2018 and entitled "Skeleton-Based Supplementation for Foreground Image Segmentation"), which is incorporated by reference herein in its entirety.

Figure 3C:
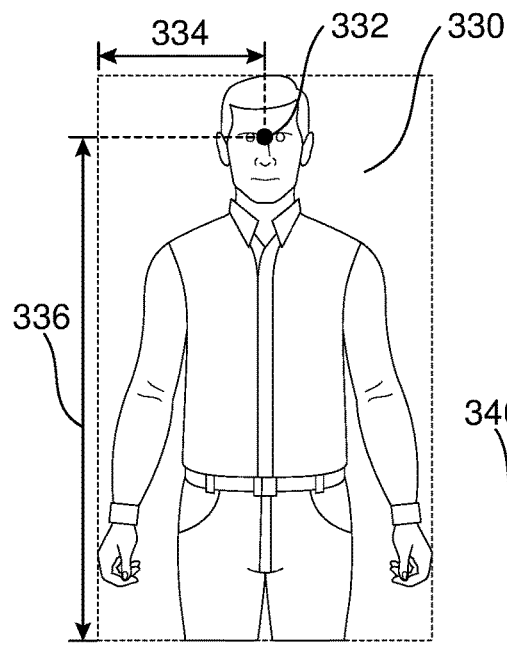
FIG. 3C shows details of the foreground image obtained in FIG. 3B for the scene shown in FIG. 3A.

FIG. 3C shows details of the foreground image 330 obtained in FIG. 3B for the scene 300 shown in FIG. 3A. The foreground image 330 has a total height of about 74% of the height of the RGB image 310 and a total width of about 25% of the width of the width of the RGB image 310. The video conferencing system 102 (for example, the multimedia communication device 100 and/or 160) is configured to obtain an eye pixel position 332 for the foreground image 330, corresponding to an image portion included in the foreground image 330 depicting the eyes of the foreground subject 132. In some examples, the eye pixel position 332 may be determined based on a centroid, middle position, or average position for an image portion identified as a portion of the foreground image 330 depicting the eyes of the foreground subject 132. In some implementations, a machine-trained algorithm used to identify the first foreground mask 316 may also be trained to identify a portion of the RGB image 310 depicting the eyes of the foreground subject 132 and/or estimate the eye pixel position 332. In this example, the eye pixel position 332 is at a lateral (or "x") pixel position or distance 334 of about 50% of the width of the foreground image 330, and is at a longitudinal (or "y") pixel position or distance 336 of about 85% of the height of the foreground image 330.

Figure 3D:
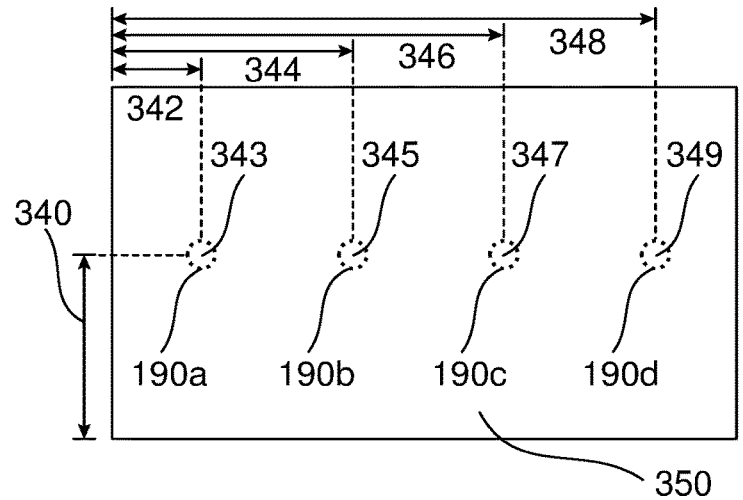
FIG. 3D shows positions in a composite image corresponding to each of the RGB camera pixel display regions of a remote multimedia communication device that will display the composite image, such as the remote multimedia communication device in FIG. 1.

FIG. 3D shows pixel positions 343, 345, 347, and 349 in a composite image 350 corresponding to respective RGB camera pixel display regions 190a, 190b, 190c, and 190d for RGB cameras 180a, 180b, 180c, and 180d of the remote multimedia communication device 160 that will display the composite image 350. In this example, each of the pixel positions 343, 345, 347, and 349 has at a longitudinal pixel position or distance 340 (in this example, along a Y axis similar to the Y axis 204 shown in FIG. 2) of about 55% of the height of the composite image 350. The pixel position 343, corresponding to the pixel display region 190a and the RGB camera 180a, has a lateral pixel position or distance 342 (in this example, along a X axis similar to the X axis 206 shown in FIG. 2) of about 11% of the width of the composite image 350. Pixel position 345 has a lateral pixel position or distance 344 of about 35%, pixel position 347 has a lateral pixel position or distance 346 of about 65%, and pixel position 349 has a lateral pixel position or distance 348 of about 89%. These pixel positions are merely illustrated for the purposed of discussion, and are not intended to be limiting on other embodiments. The video conferencing system 102 is configured to generate the composite image 150. In some implementations, the pixel positions 343, 345, 347, and 349 are provided by the remote multimedia communication device 160 to the multimedia communication device 100, and compositing is performed by the multimedia communication device 100. In some implementations, the pixel positions 343, 345, 347, and 349 are determined and used by the remote multimedia communication device 160 that will display the composite image 350, and compositing is performed by the remote multimedia communication device 160.

Figure 3E:
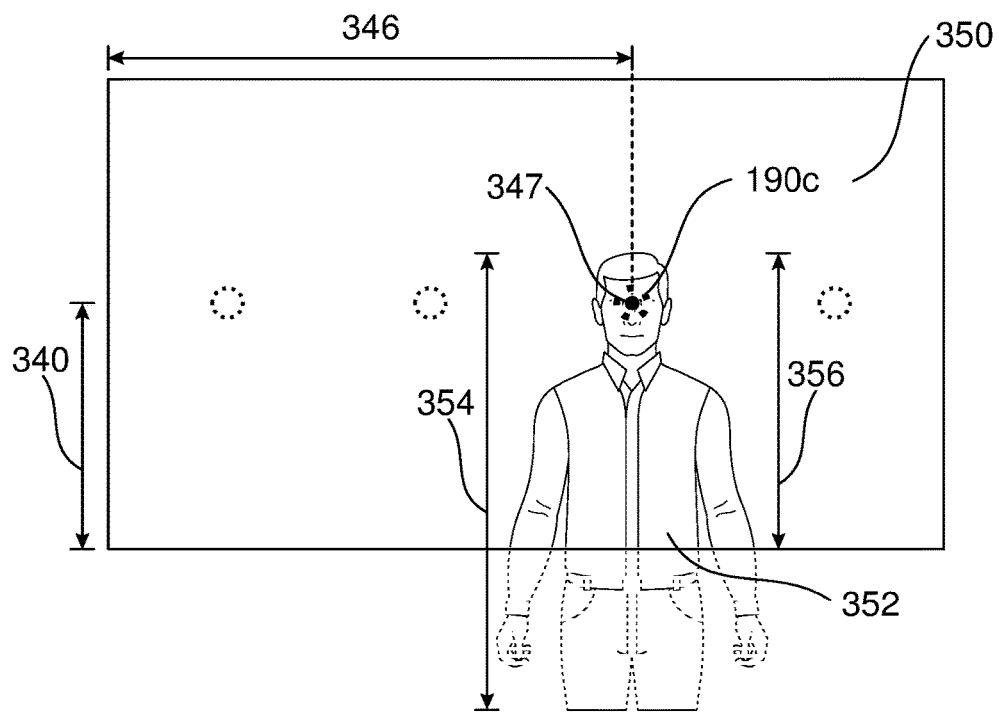
FIG. 3E illustrates a portion of the composite image generated for the scene shown in FIG. 3A using the foreground image shown in FIG. 3C.

FIG. 3E illustrates a portion of the composite image 350 generated for the scene 300 shown in FIG. 3A using the foreground image 330 shown in FIG. 3C. The foreground image 330 is selectively positioned such that the eye pixel position 332 of the foreground image 330 is at about the pixel position 347 for the RGB camera 180c and as a result displayed by the pixel display region 190c. The foreground image 330 is scaled for composition in the composite image 350. This scaling is discussed in more detail in connection with FIGS. 5A-5F. In the example shown in FIG. 3E, the foreground image 330 is scaled such that it would have a total height 354 of about 93% of the height of the composite image 350 (an increase of about 26% from the proportionate size of the foreground image 330 portion of the RGB image 310). However, due to longitudinal positioning or shifting of the foreground image 330 to have the eye position 332 at about the longitudinal position 340, the rendered height 356 of the rendered portion 352 of the foreground image 330 is only about 59% of the height of the composited image 350. The eye pixel position 332 of the rendered portion 352 foreground image 330 is at about the lateral pixel position 346 in the composite image 350. As a result, the eyes of the foreground subject 132 are displayed at about the pixel display region 190c that will be used to capture RGB images of the participant viewing the composite image 350.

FIG. 3F illustrates an example scene 360 in which the foreground subject 132 has moved laterally from the physical position in FIG. 3A and a resulting composite image 374 for the scene 360 in FIG. 3F. The composite image 374 is generated according to the techniques described in FIGS. 3A-3E. In this example, the video conferencing system 102 again selects the RGB camera 110b as the foreground camera for the foreground subject 132. The foreground subject 132 is at a distance d362 from the selected RGB camera 110b. FIG. 3F shows an RGB image 364, obtained from the selected RGB camera 110b for the scene 360, in which the foreground subject 132 has a height 366 of about 74% of the height of the RGB image 364, and the eyes of the foreground subject 132 are centered (for a position similar to the eye pixel position 332 shown in FIG. 3C) at a lateral distance 368 of about 59% of the width of the RGB image 364. As described in FIG. 3E for the foreground image 330, the resulting foreground image 370 is scaled and composited into the composite image 374 such that an eye position for the rendered portion 372 of the foreground image 370 is at about the longitudinal pixel position 340 and lateral pixel position 346 for the pixel display region 190c.

FIG. 3G illustrates an example scene 380 in which the foreground subject 132 has moved laterally from the physical position in FIG. 3F and a resulting composite image 394 for the scene 380 in FIG. 3G. The composite image 374 is generated according to the techniques described in FIGS. 3A-3E. In this example, the video conferencing system 102 again selects the RGB camera 110b as the foreground camera for the foreground subject 132. FIG. 3G shows an RGB image 384, obtained from the selected RGB camera 110b for the scene 380, in which the foreground subject 132 has a height 386 of about 74% of the height of the RGB image 384, and the eyes of the foreground subject 132 are centered at a lateral distance 388 of about 26% of the width of the RGB image 384. As described in FIG. 3E for the foreground image 330 and in FIG. 3F for the foreground image 370, the resulting foreground image 390 is scaled and composited into the composite image 394 such that an eye position for the rendered portion 392 of the foreground image 390 is at about the longitudinal pixel position 340 and lateral pixel position 346 for the pixel display region 190c.

Thus, despite the lateral movements of the foreground subject 132 that occurred from FIG. 3A to FIG. 3F to FIG. 3G, resulting in significantly different lateral positions in the FOV of the RGB camera 110b to about 74%, 59%, and 26% respectively, throughout that time the resulting composite images 350, 374, and 394 consistently rendered the eyes of the foreground subject 132 at about the longitudinal pixel position 340 of about 55% and the lateral pixel position 346 of about 65%, and maintained the rendered position of the eyes of the foreground subject 132 over the foreground camera being used to capture RGB images of the participant viewing the composite images. This both reduces distraction caused by such movements of the foreground subject 132 and enables a gaze-correct multi-party video conferencing session between at least those two participants. It is noted that the various techniques for generating composite images and displaying the composite images on the remote multimedia communication device 160 are similarly done with reversed roles, whereby the remote multimedia communication device 160 captures an RGB image of a remote participant, resulting in a composite image generated by the video conferencing system 102 being displayed on the multimedia communication device 100.

Figure 4:
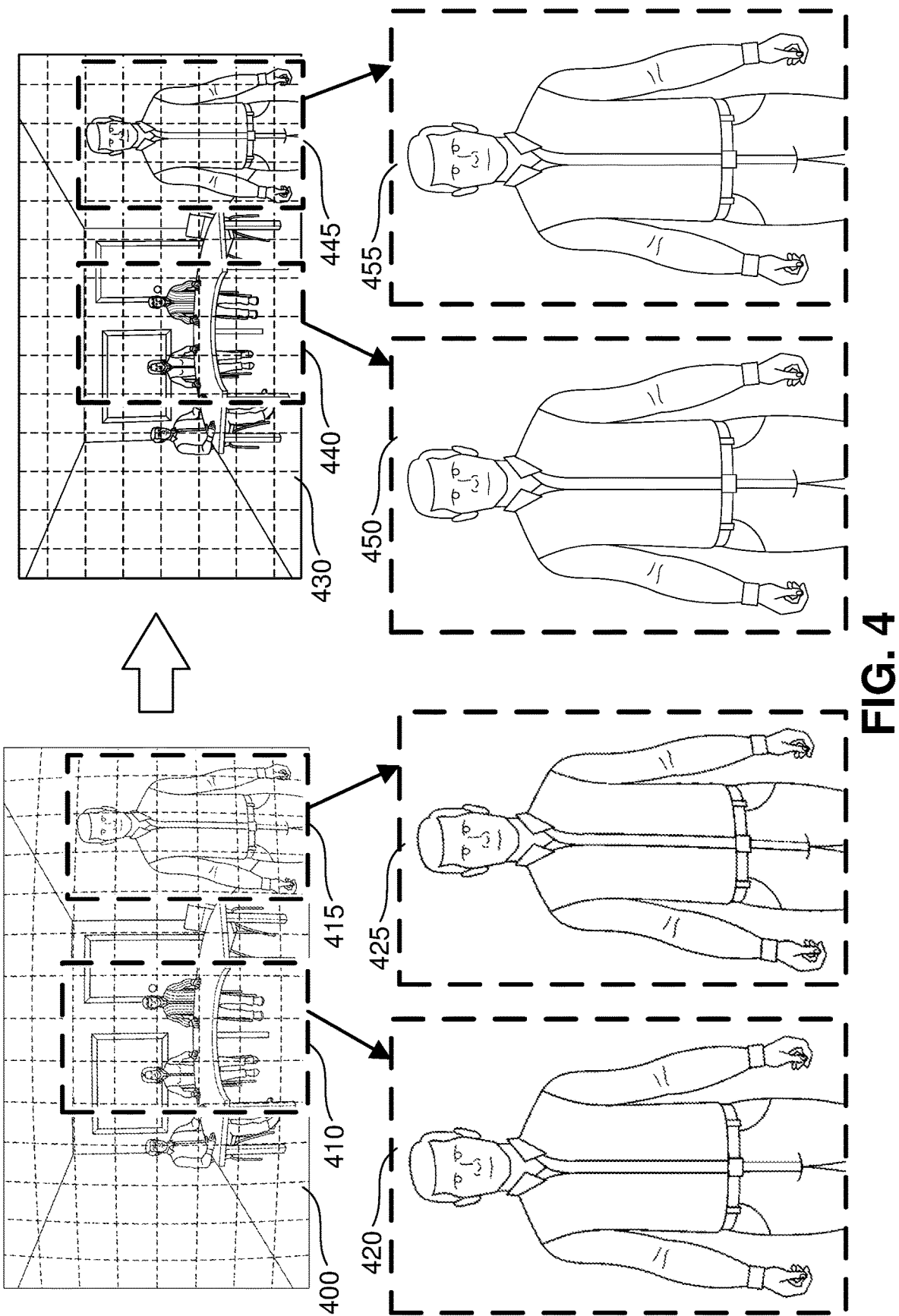
FIG. 4 illustrates use of image distortion correction applied in some implementations to reduce distortions occurring in various portions of the fields of view of the RGB cameras.

FIG. 4 illustrates use of image distortion correction applied in some implementations to reduce distortions occurring in various portions of the fields of view of the RGB cameras 110. In some implementations, some or all of the RGB cameras 110 have wide fields of view of about 90 degrees or more. For compact and/or lower cost RGB cameras 110 at such wide fields of view, curvilinear distortion such a barrel distortion is common. FIG. 4 shows an uncorrected image 400 obtained from a wide angle RGB camera 110, with dashed lines added to more clearly illustrate barrel distortion in the uncorrected image 400. The distortion is relatively minor at a central portion 410 of the uncorrected image 400, as shown by a representative foreground image 420. However, when a foreground subject moves towards an edge of the FOV of the RGB camera 110, the distortion becomes more severe and becomes noticeable, as shown by the representative foreground image 425 from a peripheral portion of the uncorrected image 400 in contrast to the central foreground image 420. In addition to being visually noticeable, such distortion, if uncorrected, can cause the eyes of the foreground subject to appear to be looking away from a remote participant even when the foreground subject is looking at the RGB camera. For example, axial distortion associated with subject distance can cause participant gaze angles to deviate. Further, if the foreground subject 132 moves from one side of the FOV to the other, the resulting foreground images demonstrate distortions in different directions, resulting in an unusual and disturbing visual effect when the foreground subject is maintained at the same lateral position as shown in FIGS. 3E, 3F, and 3G.

In some implementations, the video conferencing system 102 (for example, the multimedia communication device 100) is configured to "undistort" or correct the RGB images to reduce such distortion. FIG. 4 shows a corrected image 430, resulting from correction of the barrel distortion in the original uncorrected image 410. As a result of this undistortion, the appearance of the foreground subject is more consistent in appearance across the FOV of an RGB camera 110, as illustrated by the foreground images 450 and 455 from respective portions 440 and 445 of the corrected image 430. In some examples, other image corrections may be applied, including, but not limited to, corrections for more complex (non-curvilinear) optical distortions, vignetting, and chromatic aberration. Various image corrections may be performed using the techniques described in connection with transforming depth images in FIG. 3B.

Other non-optical distortions can occur in the form of subject distance distortions when a participant is close to an RGB camera 110. Although in some examples, depth images obtained from the depth cameras 115 may be used to correct for certain subject distance distortions, in some implementations the multimedia communication device 100 is configured to present images and interfaces on the display 105 to as to reduce the occurrence of such distortions. In some implementations, interactive user interface elements responsive to touch-based user input are presented in portions of the display device 105 likely to reduce the occurrence of images with such disproportionate portions. For example, interactive user interface elements may be positioned at or near the right or left ends of a display device 105 configured to operate as a touch screen to receive user input, such that input via a finger or handheld instrument is more likely to occur at positions away from an optical axis of an RGB camera 110 (including, for example, positions outside of an FOV of the RGB camera 110). In some examples, such interactive user interface elements may be dynamically positioned and/or repositioned based on at least a detected position of a foreground subject. For example, an interactive user interface element may be moved from a left end to a right end in response to a corresponding lateral movement of a foreground subject. As another example, the dynamic positioning and/or repositioning of user interface elements may include selecting one of multiple areas of the display device 105 where touch-based input occurs away from optical axes of one or more of the RGB cameras 110. In some examples, a hand or limb likely to be used for touch-based input may be determined for a foreground subject (for example, a determination of a dominant hand based on past user input events), and dynamic positioning or repositioning is performed based on which hand is determined likely to be used. For example, positions to the left (as viewed by a user looking at the display device) of a foreground camera may be preferred to avoid a left-handed foreground subject reaching across an FOV of the foreground camera. In some examples, a user interface may be selectively positioned to place a display area of the user interface closer than an input portion of the user interface to an optical axis of an RGB camera 110, thereby guiding a foreground subject's gaze toward a RGB camera 110 at times that they are interacting with an application on the multimedia communication device 100 and not looking at an image of a remote participant, while also guiding the foreground subject's input interactions away from the RGB camera 110 so as to avoid subject distance distortions.

FIGS. 5A-5D illustrate techniques which may be applied by the video conferencing system 102 in response to changes in distance between multimedia communication devices and respective foreground subjects. FIG. 5A illustrates a first scenario 500 occurring at about a first time, including a scene 500a at a first geographic location and a scene 500b at a different second geographic location, and a resulting composite image 540. In the scene 500a, a first participant 504 is participating in a video conferencing session via a first multimedia communication device 502. In the scene 500b, a second participant 514 is participating in the video conferencing session via a second multimedia communication device 512. Each of the multimedia communication devices 504 and 514 may be configured as described for the multimedia communication devices 100 and 160 in FIGS. 1-4. In the examples, shown in FIGS. 5A-5D, the multimedia communication devices 504 and 514 have smaller display screens than the multimedia communication device 100, but otherwise are similarly configured. For convenience of discussion, the first and second multimedia communication devices 502 and 512 are included in the video conferencing system 102.

In FIG. 5A, the video conferencing system 102 (for example, the first multimedia communication device 502) determines a distance d505 (in this example, about 70 centimeters) between the first multimedia communication device 502 and the first participant 504. The first multimedia communication device 502 includes an RGB camera 506c with a horizontal FOV 507c (in this example, about 100 degrees), which is used to capture an RGB image 520. A shoulder width of the first participant 504 occupies a horizontal angle or FOV 509 of the RGB camera 506c of about 27.4 degrees. A foreground image portion 522 of the RGB image 520, corresponding to the first participant 504, has a shoulder width 524 of about 20.4% of the width of the RGB image 520 and a height 526 of about 82% of the height of the RGB image 520. The video conferencing system 102 (for example, the first multimedia communication device 502) segments a foreground image 528, corresponding to the foreground subject 132, from the RGB image 520.

The video conferencing system 102 (for example, the second multimedia communication device 512) determines a distance d515 (in this example, about 140 centimeters) between the second multimedia communication device 512 and the second participant 514. The second multimedia communication device 512 includes an RGB camera 516c, which is used to capture an RGB image (not shown in FIG. 5A). A shoulder width of the second participant 514 occupies a horizontal angle or FOV 519 of the RGB camera 516c of about 13.4 degrees.

FIG. 5B illustrates aspects of scaling of the foreground image 528 by the video conferencing system 102 (for example, the multimedia communication devices 502 and/or 512) for the composite image 540 based on at least the distance d505 between the first multimedia communication device 502 and the first participant 504. The video conferencing system 102 is configured to determine an apparent distance d534 based on the distances d505 and d515. In this example, the apparent distance d534 is a sum of the distance d505 and the distance d515, although other techniques may be used, including, but not limited to, limiting distances d505 and/or d515 to minimum and/or maximum distances, and/or applying a weighting or scaling factor to distances d505 and/or d515. A portion of a display screen of the second multimedia communication device 512 (in this example, the entire display screen) appears to the second participant 514 to be like a "virtual window" 532, through which the first participant 504 appears to be at the apparent distance d534 from the second participant 514.

The video conferencing system 102 is configured to scale the foreground image 528 based on the apparent distance d534, resulting in the foreground image 528 being scaled such that it would have a total height 544 of about 95% of the height of the composite image 540, resulting in the rendered foreground image 542 having a shoulder width 538 of about 22.7% of the width of the composite image 540, spanning a horizontal FOV 536 of the second participant 514 of about 10.1 degrees. As in the examples in FIGS. 3A-3G, the video conferencing system 102 is configured to generate the composite image 540 with the eye position of the rendered foreground image 542 composited at about an RGB camera pixel display region 508c for the foreground camera RGB camera 516c. This results in the rendered foreground image 542 having a height 546 of about 63% of the height of the composite image 540. It is noted that the video conferencing system 102 may be configured to similarly scale an image of the second participant 514 for display to the first participant 504 via the first multimedia communication device 502, thereby achieving the same "virtual window" effect for both participants 504 and 514.

FIG. 5C illustrates a second scenario 550 occurring at about a second time after the first time in FIG. 5A and during the video conferencing session shown in FIG. 5A in which the second participant 514 has moved closer to the second multimedia communication device 512, including a scene 550a for the first participant 504 and a scene 550b for the second participant 514, and a resulting composite image 562. In this example, the first participant 504 has remained in the physical position shown in FIG. 5A. This, the distance d555 and horizontal FOV 509 are essentially the same, and the RGB image 552 captured by the RGB camera 506c has a foreground image portion 554 with a shoulder width 556 and height 558 that are approximately the same as the shoulder width 524 and height 526 in FIG. 5A, resulting in a foreground image 560 similar to the foreground image 528 in FIG. 5A.

The second participant 514 has moved to a new distance d555 of about 70 centimeters. A shoulder width of the second participant 514 occupies an increase horizontal angle or FOV 559 of the RGB camera 516c of about 21.9 degrees. FIG. 5D illustrates aspects of scaling of the foreground image 560 by the video conferencing system 102 for the composite image 562 based on at least the distance d505 between the first multimedia communication device 502 and the first participant 504 in accordance with the techniques described in FIG. 5A. In FIG. 5D, the movement of the second participant 514 has resulted in a decreased apparent distance d535, an increased horizontal FOV 537 of about 14.3 degrees. Due to the decreased distance d555, the net result is the foreground image 560 being scaled smaller than in FIG. 5A. The foreground image 560 being scaled such that it would have a total height 566 of about 71% of the height of the composite image 562 (a decrease of about 15% from the scaling of the foreground image 528 for the composite image 540 in FIG. 5A), resulting in the rendered foreground image 564 having a shoulder width 539 of about 16.9% of the width of the composite image 562, spanning a horizontal FOV 537 of the second participant 514 of about 14.3 degrees (an increase by about 42% over the horizontal FOV 536 in FIG. 5A). With the eye position of the rendered foreground image 564 composited at about the pixel display region 508c, the rendered foreground image 564 has a height 568 of about 60% of the height of the composite image 564.

FIGS. 5E and 5F illustrate additional techniques which may be applied by the video conferencing system 102 (for example, by multimedia communication devices 100 and/or 160) in response to changes in distance between the first multimedia communication device 100 and a foreground subject 132. FIG. 5E illustrates an example scene 570 in which the foreground subject 132 has moved from the physical position shown in FIG. 3F to a new physical position closer to the multimedia communication device 100, at a distance d571, and the resulting composite image 577 displayed by the multimedia communication device 160. As described in FIGS. 3A-3G, the video conferencing system 102 (for example, the multimedia communication device 100 or 160) is configured to generate the composite image 577 with the eye position of the rendered foreground image 578 composited at about the pixel display region 190 for the foreground camera (in this case, the pixel display region 190c, as in FIGS. 3E, 3F, and 3G).

In this example, as a result of the shorter distance d571, a different and larger view of the foreground subject 132 is captured in a foreground image portion 573 of an RGB image 572 from the RGB camera 110b than in the examples shown in FIGS. 3B, 3F, and 3G. For example, a shoulder width 574 of the foreground image portion 573 (at about 30% of the width of the RGB image 582) is about 70% greater than in those examples, the foreground image portion 573 has a height 575 of about 82% of the height of the RGB image 572, and only a portion of the foreground subject 132 above the waist was captured in the RGB image 572. The video conferencing system 102 segments a foreground image 576 corresponding to the foreground subject 132 from the RGB image 572.

The video conferencing system 102 (for example, the multimedia communication device 100 or 160) is configured to scale the foreground image 576 based on at least the distance d571 between the multimedia communication device 100 and the foreground subject 132. The video conferencing system 102 (for example, the multimedia communication device 100) may determine the distance d571 based on at least depth images from the depth cameras 115. As a result, the foreground image 576 is scaled such that it would have a total height 580 of about 65% of the height of the composite image 577 (a decrease of about 21% from the proportionate size of the foreground image portion 573 of the RGB image 572), resulting in a rendered shoulder width 579 of about 23.2%. Since a lower portion of the foreground subject 132 was not captured in the RGB image 572, most of the foreground image 576 is included in the composite image 577, with the rendered portion 578 of the foreground image 576 having a rendered height 581 of about 59% of the height of the composite image 577. As a result of the scaling based on distance, the foreground subject 132 has a very similar appearance in FIGS. 3F and 5A despite the differences in the captured RGB images 364 and 575.

FIG. 5F illustrates an example scene 582 in which the foreground subject 132 has moved from the physical position shown in FIG. 5E to a new physical position further away from the multimedia communication device 100, at a distance d583, and the resulting composite image 589. In this example, as a result of the greater distance d583, a different and smaller view of the foreground subject 132 is captured in a foreground image portion 585 of an RGB image 584 from the RGB camera 110b than in the examples shown in FIGS. 3B, 3F, 3G, and 5E. For example, a shoulder width 586 of the foreground image portion 585 is only about 15.6% of the width of the RGB image 584, while the foreground image portion 585 has a height 587 of about 65% of the height of the RGB image 584. The video conferencing system 102 segments a foreground image 588 corresponding to the foreground subject 132 from the RGB image 584.

As described in FIG. 5E, the video conferencing system 102 again scales the foreground image 588 based on at least the distance d583 between the multimedia communication device 100 and the foreground subject 132. As a result, the foreground image 588 is scaled such that it would have a total height 592 of about 97% of the height of the composite image 589 (an increase of about 49% over the scaling of the foreground image 576 portion for the composite image 577 in FIG. 5E), resulting in the rendered foreground image 590 having a shoulder width 591 of about 23.2%, which is substantially similar to the shoulder width 579 in FIG. 5E. The rendered foreground image 590 of the foreground image 587 has a rendered height 592 of about 59% of the height of the composite image 589, which is substantially similar to the rendered height 580 in FIG. 5E.

Thus, in the examples shown in FIGS. 5E and 5F, despite changes in distance between the participant 132 and the multimedia communication device 100 and corresponding differences in captured foreground image portions 573 and 585, the consistency in appearance for the foreground subject 132 described in FIGS. 3A-3G is maintained, including maintaining the rendered position of the eyes of the foreground subject 132 over the foreground camera being used to capture RGB images of the participant viewing the composite images (in the examples of FIGS. 5E and 5F, RGB camera 180c). Thus, in the examples of FIGS. 5E and 5F, movement of the foreground subject 132 throughout much of an FOV of an RGB camera has a substantially reduced effect, both reducing distraction from changes in appearance caused by such movements of the foreground subject 132 and enabling a gaze-correct multi-party video conferencing session between at least those two participants despite such movements, granting participants more freedom within more effective video conferencing sessions.

Although an ability to establish eye contact is an important component for improved video conferencing experiences, an ability to effectively convey dynamic cooperative spatial and postural behaviors by which people ordinarily interact adds another significant dimension to the experience and presents another area for improvement. Adam Kendon's F-formation system of spatial organization describes various spatial patterns that naturally arise during face-to-face interactions between two or more people to create a transactional segment (which may be referred to as a joint transactional space or an "o-space") for directing attention and manipulating objects. In one-on-one interactions, which are significantly more common than interactions with more than two people, three spatial patterns were observed: a side-by-side arrangement where two participants stand close together facing the same direct, a face-to-face (or vis-à-vis) arrangement with two participants facing each other, and an off-axis arrangement where two individuals stand off-axis to each other (for example, perpendicularly to each other in an L-arrangement as if standing on two edges of the letter 'L'). Subconsciously, the face-to-face arrangement—an arrangement commonly achieved by conventional video conferencing—is considered confrontational and uncomfortable over time, and instead the off-axis arrangement is preferred. Additionally, spatial positioning is dynamic over the course of a conversation. For example, the face-to-face arrangement is often preferred when people greet each other at a beginning of a conversation, which then shifts to the off-axis arrangement.

Figure 6A:
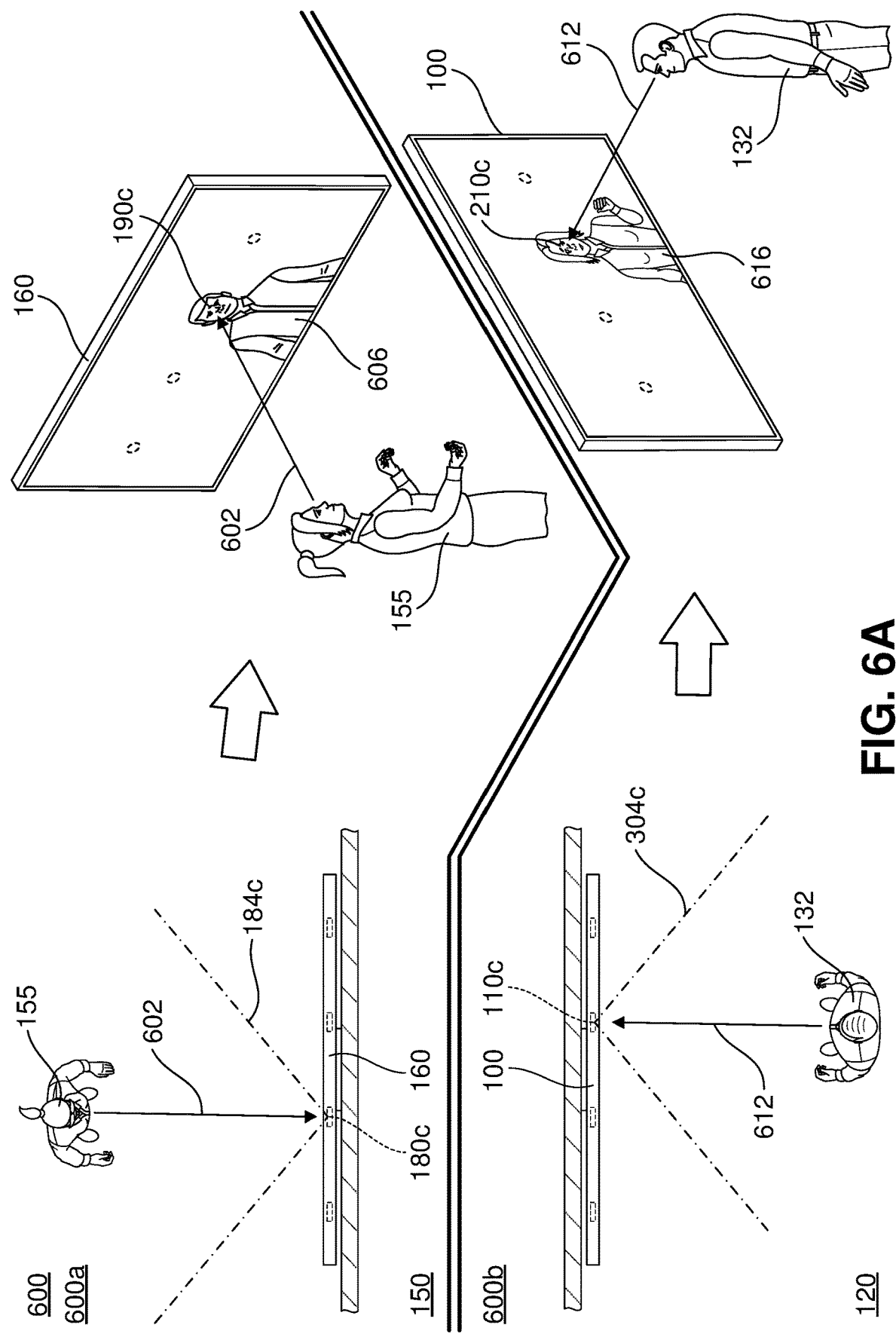
FIGS. 6A-6D illustrate techniques for selecting and changing RGB cameras that further support providing gaze-correct video conferencing sessions among and between various participants at various geographic locations during a single video conferencing session.

The video conferencing system 102 enables such spatial arrangements to be dynamically created, communicated, and controlled by participants, thereby further improving the perceived quality, comfort, and effectiveness of video conferencing sessions. FIGS. 6A-6D illustrate techniques for selecting and changing RGB cameras that further support providing gaze-correct video conferencing sessions among and between various participants at various geographic locations during a single video conferencing session. FIG. 6A illustrates a first scenario 600 occurring at about a first time, including a scene 600a at the second geographic location 150 shown in FIG. 1 and a scene 600b at the first geographic location 120 shown in FIG. 1. Two views are shown for the scene 600a: on the left is a top view showing a physical position of the participant 155 relative to the multimedia communication device 160, and on the right a perspective view showing the participant 155 interacting with a rendered foreground image 606 of the participant 132 displayed by the multimedia communication device 160. Likewise, two views are shown for the scene 600b: on the left is a top view showing a physical position of the participant 132 relative to the multimedia communication device 100, and on the right a perspective view showing the participant 132 interacting with a rendered foreground image 616 of the participant 155 displayed by the multimedia communication device 100.

The video conferencing system 102 is configured to determine (for example, at the multimedia communication device 160) a physical position of the participant 155 relative to the multimedia communication device 160 for selecting (for example, at the multimedia communication device 100) an RGB camera 110 of the multimedia communication device 100 as a foreground camera which will be used by the multimedia communication device 100 to capture images of the participant 132 and to which the portion of the rendered foreground image 616 depicting the eyes of the participant 155 will be aligned. Likewise, the video conferencing system 102 (for example, the multimedia communication device 100) is configured to determine (for example, at the multimedia communication device 100) a physical position of the participant 132 relative to the multimedia communication device 100 for selecting (for example, at the multimedia communication device 160) an RGB camera 180 of the multimedia communication device 160 as a foreground camera which will be used by the multimedia communication device 100 to capture images of the participant 132 and to which the portion of the rendered foreground image 606 depicting the eyes of the participant 132 will be aligned. In some implementations, the video conferencing system 102 is configured to select the RGB camera 180 having a lateral position most closely corresponding to a detected lateral physical position of the participant 132 relative to the multimedia display device 100. In such implementations, in some examples the video conferencing system 102 is configured to determine which of the RGB cameras 110 the participant 132 is most directly aligned with, and the video conferencing system 102 is configured to select the corresponding RGB camera 180 as the active camera (where RGB cameras 180a, 180b, 180c, and 180d respectively correspond to the RGB cameras 110a, 100b, 100c, and 110d). The multimedia communication devices 100 and 160 are also configured reciprocally.

In the particular example shown in FIG. 6A, the video conferencing system 102 determines that the participant 155 is laterally aligned with the RGB camera 180c. In response to this determination, the video conferencing system 102 selects the corresponding RGB camera 110c as the foreground camera for the participant 132. As a result, an RGB image captured by the RGB camera 110c will be used for generating the rendered foreground image 606, and the eyes of the participant 155 depicted in the rendered foreground image 616 are aligned with the position of the pixel display region 210c for the RGB camera 110c.

Similarly, the video conferencing system 102 may determine that the participant 132 is laterally aligned with the RGB camera 110c. In response to this determination, the video conferencing system 102 selects the corresponding RGB camera 180c as the foreground camera for the participant 155. As a result, an RGB image captured by the RGB camera 180c will be used for generating the rendered foreground image 616, the eyes of the participant 132 depicted in the rendered foreground image 606 are aligned with the position of the pixel display region 190c for the RGB camera 180c, and the gaze direction 602 of the participant 155 is directed at the RGB camera 180c.

As the participant 132 tends to gaze at the eyes of the participant 155 during a video conferencing session, a gaze direction 612 of the participant 132 is directed at the RGB camera 110c behind the displayed eyes of the participant 155. Likewise, as the participant 155 tends to gaze at the eyes of the participant 132 during a video conferencing session, a gaze direction 602 of the participant 155 is directed at the RGB camera 180c behind the displayed eyes of the participant 132. As a result, both of the multimedia communication devices 100 and 160 capture foreground images in which the participants 132 and 155 are looking directly at the foreground cameras, resulting in a gaze-correct video conferencing session in which the participants 132 and 155 feel that they are making eye contact with each other. Additionally, the multimedia communication devices 100 and 160 each convey a face-to-face spatial arrangement to the participants 132 and 155, which may be preferable at certain times during the session, such as an initial salutary portion in which the participants 132 and 155 greet each other.

Figure 6B:
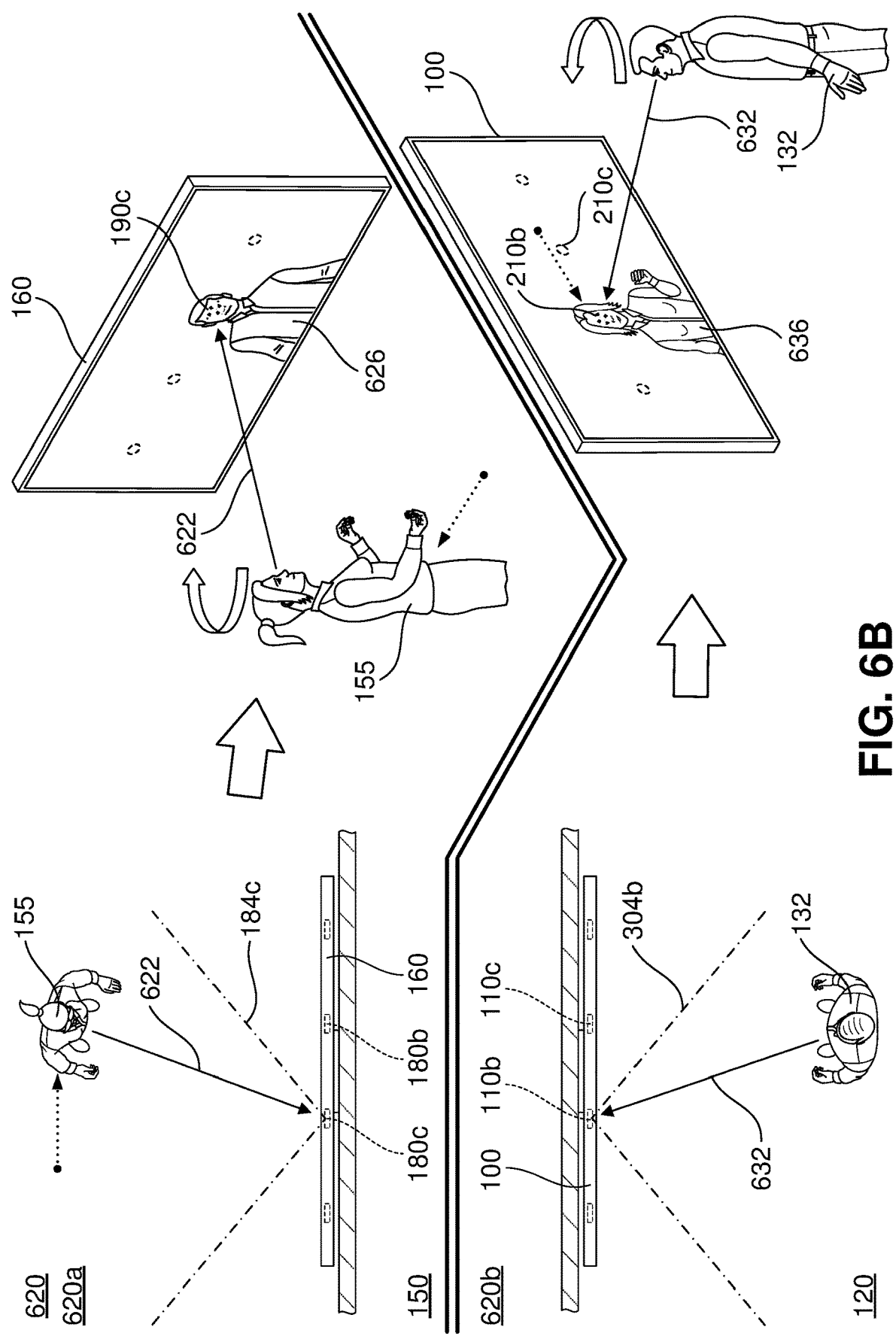

FIG. 6B illustrates a second scenario 620 occurring at about a second time after the first time shown in FIG. 6A and during the video conferencing session shown in FIG. 6A, including a scene 620a at the second geographic location 150 and a scene 620b at the first geographic location 120. In FIG. 6B, the video conferencing system 102 (for example, the multimedia communication device 160) has determined that the participant 155 has moved to a new physical position, which is still within an FOV 184c of the RGB camera 180c. Based on the new physical position, the video conferencing system 102 determines that the participant 155 is at a lateral physical position relative to the multimedia communication device 160 that is more aligned with the RGB camera 180b than the previous RGB camera 180c. In response to this determination, the video conferencing system 102 selects the corresponding RGB camera 110b as the foreground camera for the participant 132, changing from the RGB camera 110c selected in FIG. 6A.

Due to the selection of the RGB camera 110b as the foreground camera for the participant 132 in response to the new physical position of the participant 155, images of the participant 155 are displayed in alignment with the RGB camera area 210b for the RGB camera 110b, as shown by the position of the rendered foreground image 636 in FIG. 6B. As a result, the gaze direction 632 of the participant 132 moves from the RGB camera area 210c to the RGB camera area 210b. An RGB image captured by the RGB camera 110b will be used for generating the rendered foreground image 626 displayed to the participant 155 via the video conferencing session, and with the gaze direction 632 directed at the RGB camera 110b, a gaze-correct video conferencing session is maintained. For the participant 155, the rendered foreground image 626 continues to be aligned with the RGB camera area 190c as in FIG. 6A, as the participant 132 has not moved significantly and the video conferencing system 102 continues to determine that the subject 132 is most aligned with the RGB camera 110c (as in FIG. 1). Due to the new physical position of the participant 155 in FIG. 6B, the participant 155 has turned slightly to continue a gaze direction 622 directed at the RGB camera 180c, and a gaze-correct video conferencing session is maintained. Additionally, in response to the detected movement and change in physical position of the participant 155, the multimedia communication devices 100 and 160 each convey an off-axis spatial arrangement to each of the participants 132 and 155 that is responsive to movements of the participant 132 and/or 155, as further illustrated by FIGS. 6C and 6D below.

Figure 6C:
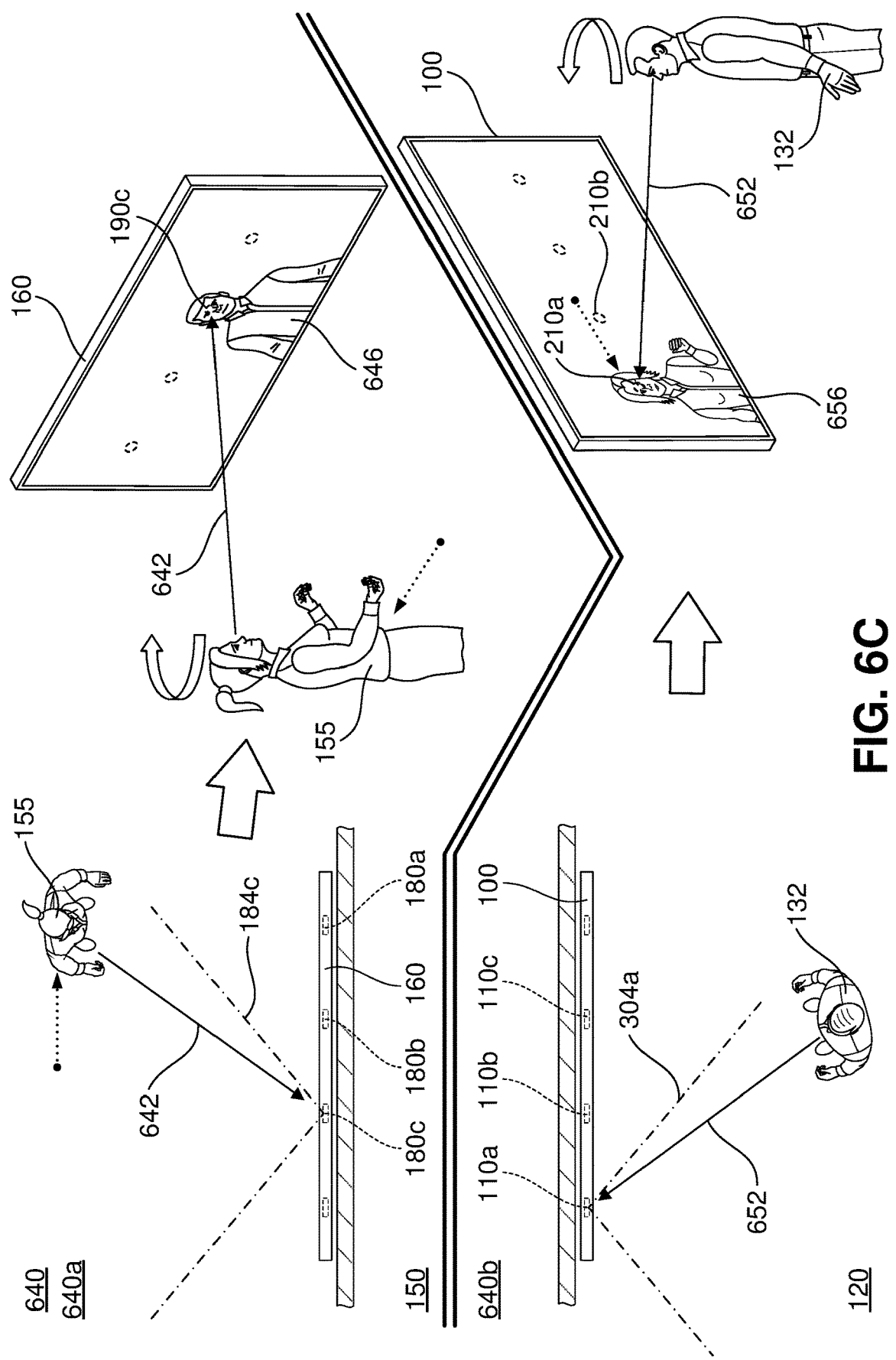

FIG. 6C illustrates a third scenario 640 occurring at about a third time after the second time shown in FIG. 6B and during the video conferencing session shown in FIGS. 6A and 6B, including a scene 640a at the second geographic location 150 and a scene 640b at the first geographic location 120. In FIG. 6C, the video conferencing system 102 has determined that the participant 155 has moved to another new physical position, which is still within an FOV 184c of the RGB camera 180c. Based on the new physical position, the video conferencing system 102 determines that the participant 155 is at a lateral physical position relative to the multimedia communication device 160 that is more aligned with the RGB camera 180a than the previous RGB camera 180b. In response to this determination, the video conferencing system 102 selects the corresponding RGB camera 110a as the foreground camera for the participant 132, changing from the RGB camera 110b selected in FIG. 6B.

Due to the selection of the RGB camera 110a as the foreground camera for the participant 132 in response to the new physical position of the participant 155, images of the participant 155 are displayed in alignment with the RGB camera area 210a for the RGB camera 110a, as shown by the position of the rendered foreground image 656 in FIG. 6C. As a result, the gaze direction 652 of the participant 132 moves from the RGB camera area 210b to the RGB camera area 210a, and the participant 132 turns his body to facilitate the new gaze direction 652. An RGB image captured by the RGB camera 110a will be used for generating the rendered foreground image 646 displayed to the participant 155 via the video conferencing session, and with the gaze direction 652 directed at the RGB camera 110a, a gaze-correct video conferencing session is maintained. For the participant 155, the rendered foreground image 646 continues to be aligned with the RGB camera area 190c as in FIG. 6B. Due to the new physical position of the participant 155 in FIG. 6C, the participant 155 has turned her head to continue a gaze direction 642 directed at the RGB camera 180c, and a gaze-correct video conferencing session is maintained. Additionally, in response to the detected movement and change in physical position of the participant 155, the multimedia communication devices 100 and 160 each convey a more oblique off-axis spatial arrangement to each of the participants 132 and 155 than in FIG. 6B.

Figure 6D:
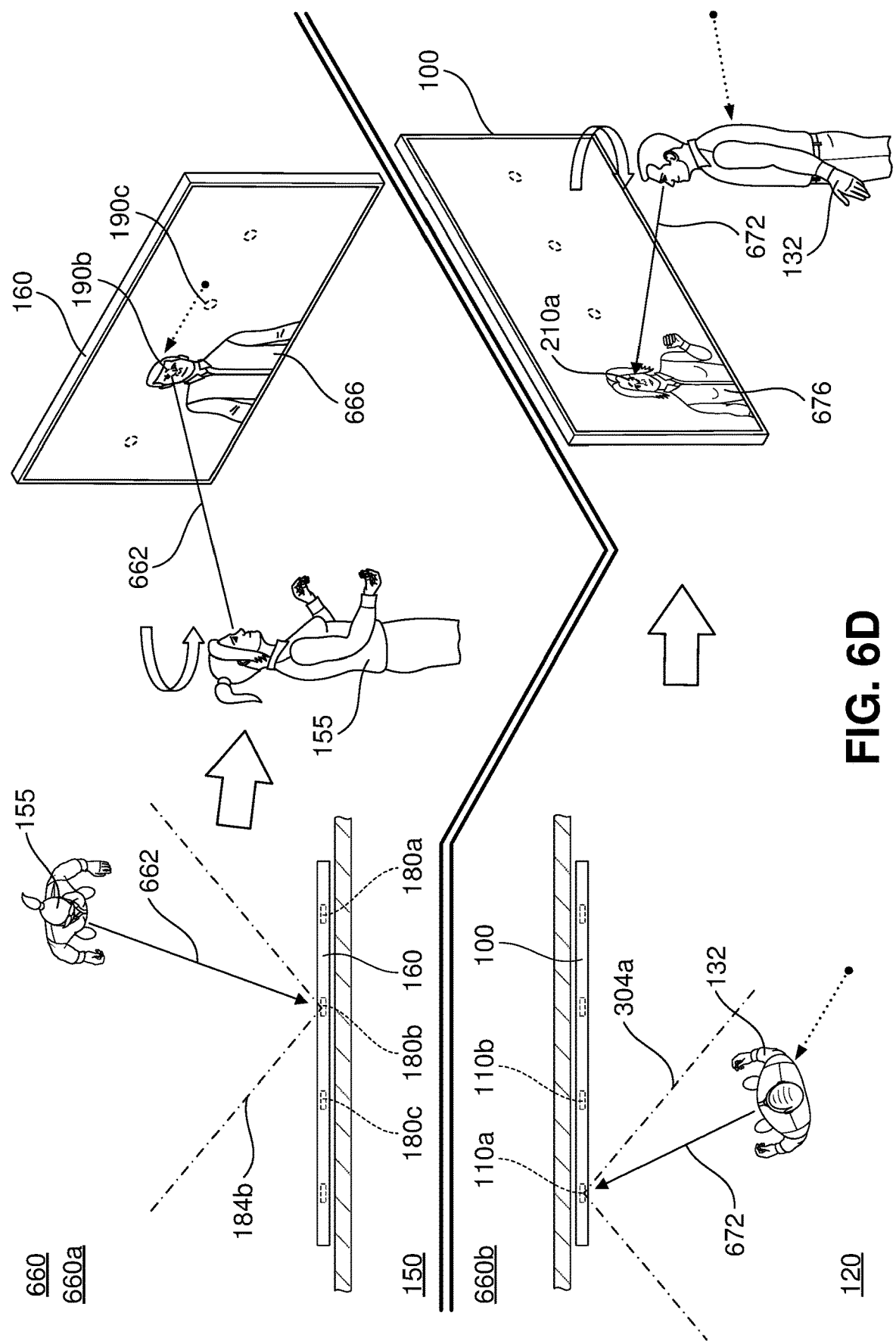

FIG. 6D illustrates a fourth scenario 660 occurring at about a fourth time after the third time shown in FIG. 6C and during the video conferencing session shown in FIGS. 6A-6C, including a scene 660a at the second geographic location 150 and a scene 660b at the first geographic location 120. In FIG. 6D, the video conferencing system 102 (for example, the multimedia communication device 100) has determined that the participant 132 has moved to a new physical position, which is still within an FOV 304a of the RGB camera 110a. Based on the new physical position, the video conferencing system 102 determines that the participant 132 is at a lateral physical position relative to the multimedia communication device 100 that is more aligned with the RGB camera 110b than the previous RGB camera 110c. In response to this determination, the video conferencing system 102 selects the corresponding RGB camera 180b as the foreground camera for the participant 155, changing from the RGB camera 180c selected in FIG. 6A.

Due to the selection of the RGB camera 180b as the foreground camera for the participant 155 in response to the new physical position of the participant 132, images of the participant 132 are displayed in alignment with the RGB camera area 190b for the RGB camera 180b, as shown by the position of the rendered foreground image 666 in FIG. 6D. As a result, the gaze direction 662 of the participant 155 moves from the RGB camera area 190c to the RGB camera area 190b. An RGB image captured by the RGB camera 180b will be used for generating the rendered foreground image 676 displayed to the participant 132 via the video conferencing session, and with the gaze direction 662 directed at the RGB camera 180b, a gaze-correct video conferencing session is maintained. For the participant 132, the rendered foreground image 676 continues to be aligned with the RGB camera area 180a as in FIG. 6C. With a gaze direction 672 continuing to be directed at the RGB camera 110a, a gaze-correct video conferencing session is maintained Additionally, in response to the detected movement and change in physical position of the participant 132, the multimedia communication devices 100 and 160 each convey a different off-axis spatial arrangement to each of the participants 132 and 155 than illustrated in FIG. 6C.

Thus, as illustrated by the examples shown in FIGS. 6A-6D, the video conferencing system 102, via the multimedia communication devices 100 and 160, enables spatial arrangements to be dynamically created, communicated, and controlled by video conferencing session participants. As a result, participants can assume a natural off-axis, diagonally opposite formation while retaining gaze awareness. A participant can look at another participant in the eyes when they want to, but is not forced to do so. Additionally, the video conferencing system 102 conveys when another participant chooses to look away. This interaction and information is conveyed in a natural manner that conforms to established social conventions for in-person face-to-face interactions. Further, when the techniques of FIGS. 5A-5D are combined with the techniques of FIGS. 6A-6D, spatial arrangements may be controlled and perceived in further detail, further enhancing interactions.

Figure 7A:
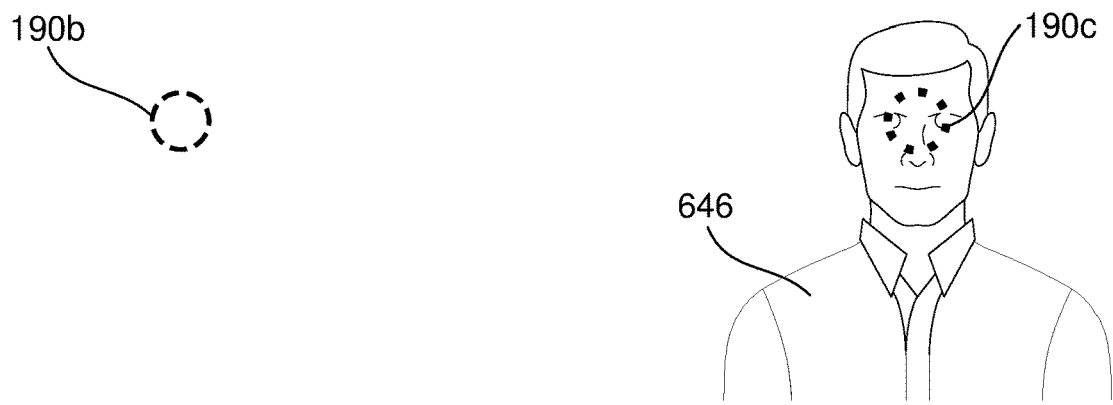
FIGS. 7A-7C illustrate a technique used in some implementations, in which rendered foreground images make an animated transition from one RGB camera area to another when a new foreground camera is selected, in which over several successive video frames the rendered foreground images "glide" or otherwise approximate lateral human motion from the previous RGB camera area to the new RGB camera area.
Figure 7B:
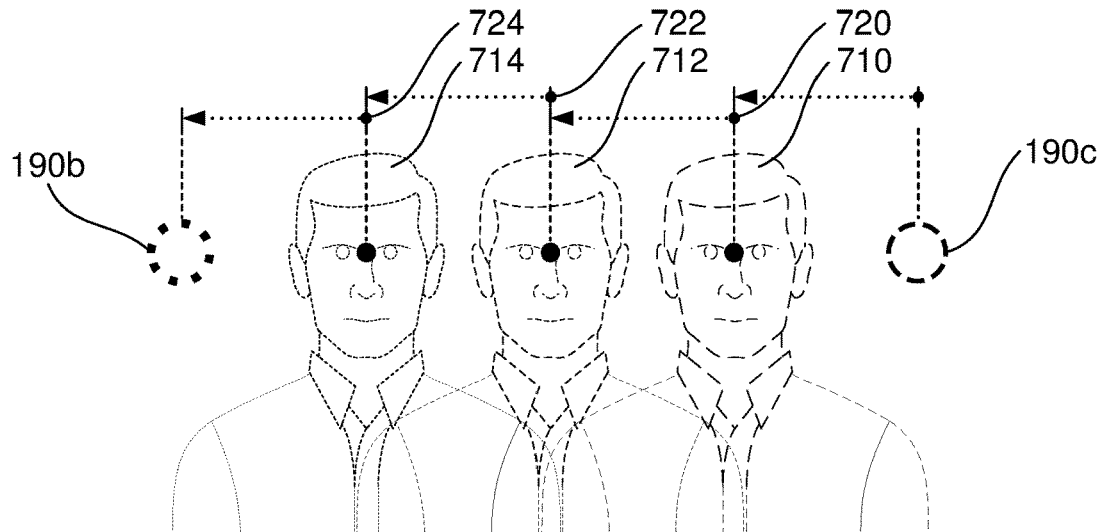
Figure 7C:
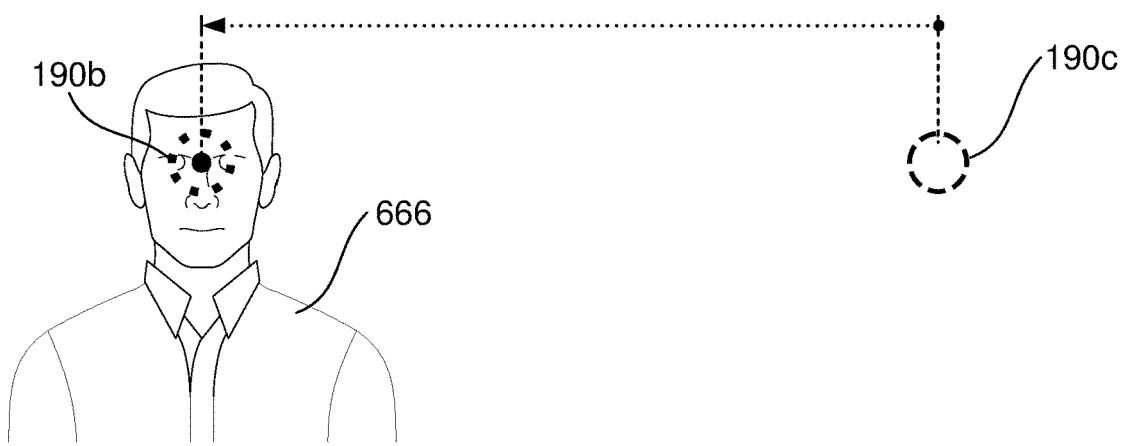

FIGS. 7A-7C illustrate a technique used in some implementations, in which rendered foreground images make an animated transition from one RGB camera area to another when a new foreground camera is selected, in which over several successive video frames the rendered foreground images "glide" or otherwise approximate lateral human motion from the previous RGB camera area to the new RGB camera area. FIG. 7A illustrates a position of the rendered foreground image 646 in FIG. 6C at a point when the RGB camera 180c has been selected as the foreground camera for the participant 155. Accordingly, the eyes of the participant 132 in the rendered foreground image 646 are aligned with the RGB camera area 190c. FIG. 7B illustrates an animated transition to a new RGB camera area 190b in response to the scenario 660 shown in FIG. 6D. Over several video frames, a first rendered foreground image 710 for the participant 132 is first displayed at an intermediate lateral position 720 between the RGB camera areas 190c and 190b, followed by a second rendered foreground image 712 for the participant 132 being displayed at an intermediate lateral position 722 between the intermediate lateral position 720 and the RGB camera area 190b, which is followed by a third rendered foreground image 714 for the participant 132 being displayed at an intermediate lateral position 724 between the intermediate lateral position 722 and the RGB camera area 190b. Although three intermediate lateral positions 720, 722, and 724 are shown in FIG. 7B, any number of intermediate positions may be selected. FIG. 7C illustrates the rendered foreground image 766 at its target position aligned with the RGB camera area 190b, as shown in in FIG. 6D. An advantage of performing the animated transition shown in FIGS. 7A-7C is that the gaze direction 662 of the participant 155 will track the animated position, resulting in a smoother transition in the gaze direction captured by the new foreground camera and displayed to the participant 132. Additionally, such animated transitions in position are visually engaging for participants, further drawing participant's gazes to the rendered eye positions. In some implementations, more exaggerated motions may be implemented and selected to further enhance these effects.

Figure 8:
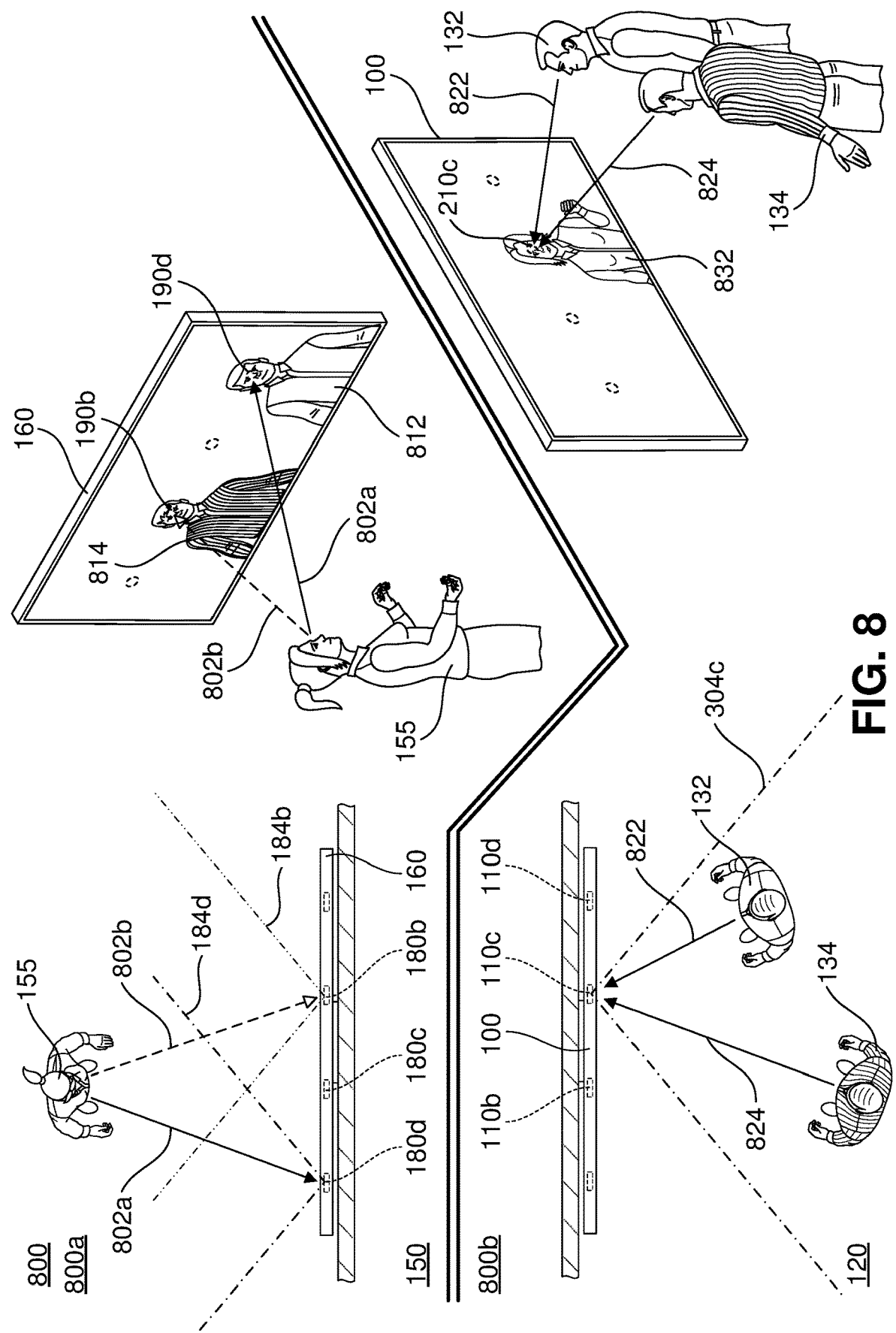
FIG. 8 illustrates techniques involving having multiple participants concurrently participating in a video conferencing session via a single shared multimedia communication device.

FIG. 8 illustrates techniques involving having multiple participants 132 and 134 concurrently participating in a video conferencing session via a single shared multimedia communication device 100. FIG. 8 continues the video conferencing session shown in FIGS. 6A-6D, and illustrates a fifth scenario 800 including a scene 800a at the second geographic location 150 and a scene 800b at the first geographic location 120. In FIG. 8, the previously seated participant 134 is now standing and in close proximity to the multimedia communication device 100. As a result, the video conferencing system 102 (for example, the multimedia communication device 100) has identified the two participants 132 and 134 as two different and concurrent foreground subjects. Additionally, the participant 132 is at a different physical position than in FIG. 6D. Based on their physical positions relative to the multimedia communication device 100, the video conferencing system 102 determines that the participant 132 is at a lateral physical position relative to the multimedia communication device 100 that is most aligned with the RGB camera 110d and that the participant 134 is at a lateral physical position relative to the multimedia communication device 100 that is most aligned with the RGB camera 110b.

In response to these determinations, for the participant 132, the video conferencing system 102 (for example, the multimedia communication device 160) selects the RGB camera area 190d for the RGB camera 180d corresponding to the RGB camera 110d for alignment of the rendered foreground image 812. For the participant 134, the video conferencing system 102 (for example, the multimedia communication device 160) selects the RGB camera area 190b for the RGB camera 180b corresponding to the RGB camera 110b for alignment of the rendered foreground image 814. As a result, the eyes of each of the participants 132 and 134 are displayed by the multimedia communication device 160 in front of respective RGB cameras 180d and 180b, enabling the multimedia communication device 160 to capture gaze-aligned RGB images of the participant 155 when the participant 155 looks at either of the participants 132 and 134.

When multiple participants are displayed in alignment with different RGB cameras 180, the video conferencing system 102 (for example, the multimedia communication device 160) is configured to dynamically select a foreground camera from one of the RGB cameras 180 associated with a displayed participant. In some implementations, the video conferencing system 102 is configured to determine a gaze direction for the participant 155 and select the RGB camera 180 most directly aligned with the gaze direction of the participant 155. In the example shown in FIG. 8, the participant is currently looking at the participant 132 along the gaze direction 902a, and as a result, the current foreground camera for the participant 155 is the RGB camera 180d. In response to the participant 155 shifting to the gaze direction 902b to look at the participant 134, the video conferencing system 102 may select the RGB camera 180b as the foreground camera.

In FIG. 8, the participant 155 is also at a different physical position than shown in FIG. 6D. Based on the new physical position, the video conferencing system 102 determines that the participant 155 is at a lateral physical position relative to the multimedia communication device 160 that is most aligned with the RGB camera 180c. As in the scenario 600 shown in FIG. 6A, in response to this determination, the video conferencing system 102 selects the corresponding RGB camera 110c as the foreground camera for the participant 132. Additionally, as only one participant 155 is displayed on the multimedia communication device 100, the video conferencing system 102 also selects the corresponding RGB camera 110c as the foreground camera for the participant 134. As both of the participants 132 and 134 will tend to gaze at the eyes of the participant 155, as illustrated by the gaze directions 922 and 924, the RGB camera 110c is effective for capturing gaze-aligned RGB images for both of the participants 132 and 134 for generating the rendered foreground images 912 and 914. As a result, the multimedia communication devices 100 and 160 effectively establish a gaze-correct video conferencing session is for all three participants 132, 134, and 155, even where there is a greater number of participants than a number of multimedia communication devices.

Figure 9:
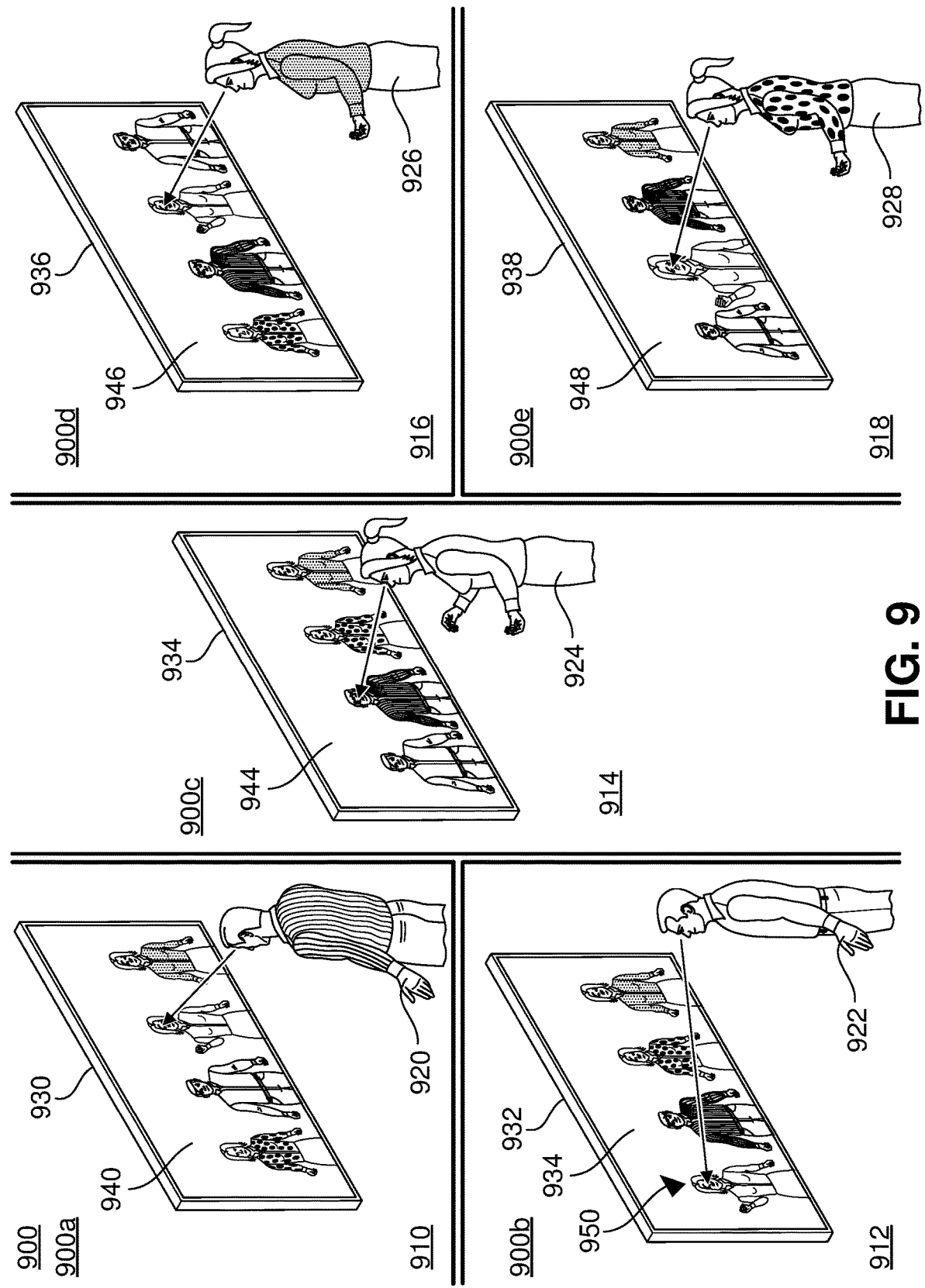
FIG. 9 illustrates an example of gaze-correct multi-party video conferencing among five participants each at a different geographic location.

FIG. 9 illustrates an example of gaze-correct multi-party video conferencing among five participants each at a different geographic location. In some examples, similar techniques and advantages may be realized with three or more participants each at different locations. FIG. 9 illustrates a scenario 900 including a five scenes 900a, 900b, 900c, 900d, and 900e at respective different geographic locations 910, 912, 914, 916, and 918 with respective multimedia communication devices 930, 932, 934, 936, and 938 used by respective participants 920, 922, 924, 926, and 928 to participate in a single multi-party video conference session. Each of the multimedia communication devices 930, 932, 934, 936, and 938 may be configured as described for the multimedia communication devices 100 and 160 in FIGS. 1-8. For convenience of discussion, the multimedia communication devices 930, 932, 934, 936, and 938 are included in the video conferencing system 102. The discussion will focus on the multimedia communication device 930, as it is generally representative of the behavior of the other multimedia communication devices 932, 934, 936, and 938 in this example.

In response to the large number of participants at different geographic locations, the video conferencing system 102 (for example, the multimedia communication device 930) determines for the multimedia communication device 930 which RGB camera is aligned with each of the rendered foreground images of the other participants 922, 924, 926, and 928. In order to fit all four of the rendered foreground images in a composite image 940, each of the rendered foreground images has a narrower width than in the previous examples. However, as in previous examples, the eyes of all of the participants 922, 924, 926, and 928 are displayed over respective RGB camera areas. This, much as in FIG. 8, enables the multimedia communication device 930 to capture gaze-aligned RGB images of the participant 920 when the participant 920 looks at any of the participants 922, 924, 926, and 928.

At the time shown in FIG. 9, the participant 924 is currently speaking, and accordingly may be referred to as the "active speaker" in the video conferencing session. In some implementations or circumstances, the video conferencing system 102 (for example, the multimedia communication device 930) may automatically select the RGB camera associated with the active speaker as the foreground camera, although gaze detection may be used in some implementations, as discussed in FIG. 8. In this example, the participant 924 is engaged in a discussion with the participant 920, and as a result the gaze direction of the participant 924 is directed at the RGB camera corresponding to the participant 920. In some examples, the video conferencing system 102 may be configured to provide a visual indication of the active speaker, to assist participant identification of and focus on the active speaker. In some examples, as shown by the multimedia communication device 932, a graphical element 950, such as, but not limited to, an icon or outline may be included in a composite image 1042 to highlight the active speaker. In some examples, as shown by the multimedia communication device 938, the active speaker may be scaled differently than other participants and shown at a larger size than the other participants while still aligning the displayed eyes of the participants with respective RGB cameras.

As a result of the techniques described for FIG. 9, the multimedia communication devices 930, 932, 934, 936, and 938 effectively establish a gaze-correct multi-party video conferencing session even where there is a large number of participants using different multimedia communication devices.

Figure 10:
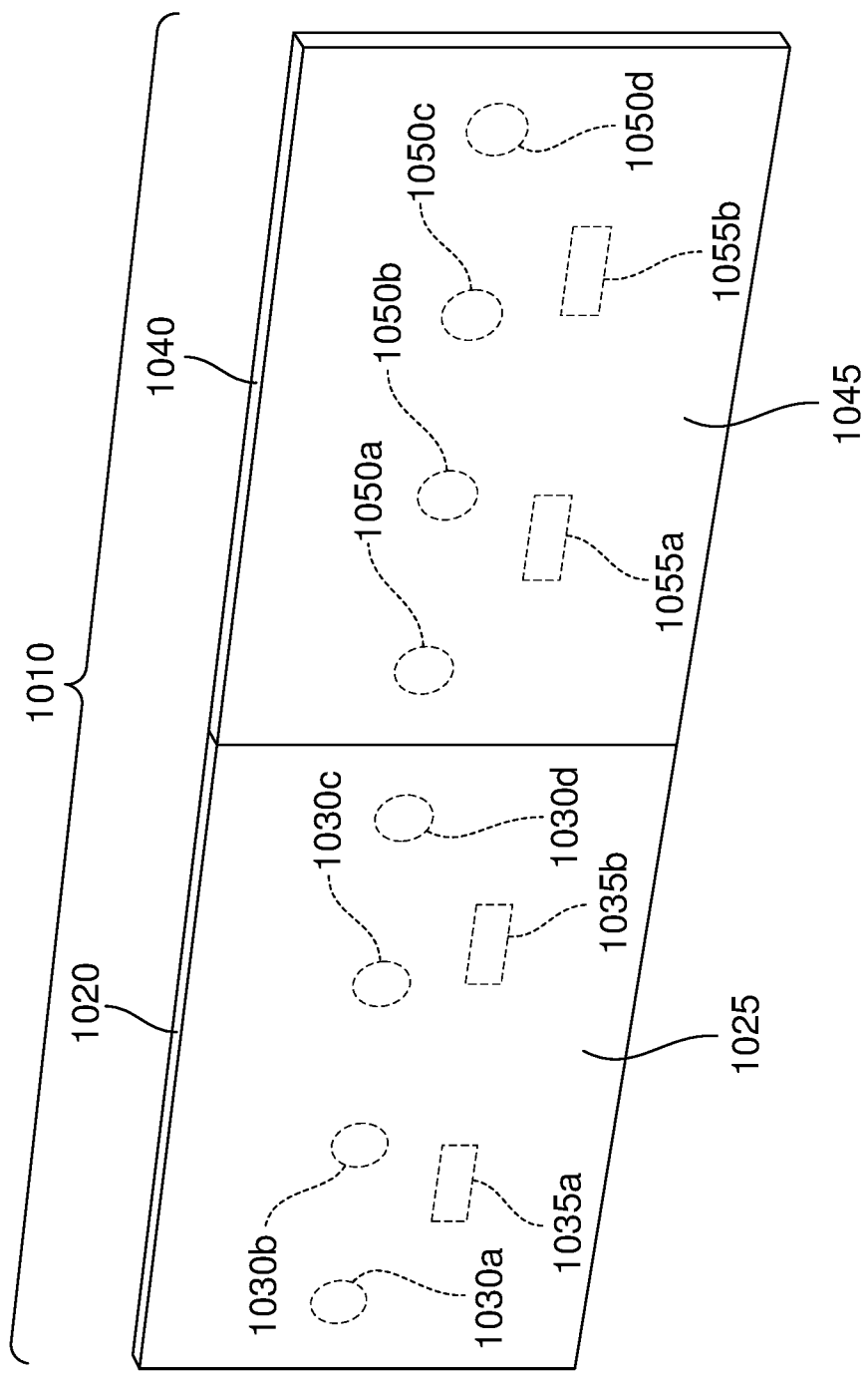
FIG. 10 illustrates an example in which two multimedia communication devices are tiled adjacent to each other to provide a larger multimedia communication device or system.

FIG. 10 illustrates an example in which two multimedia communication devices 1020 and 1040 are tiled adjacent to each other to provide a larger multimedia communication device or system 1010. Each of the multimedia communication devices or systems 1010, 1020, and 1040 may be configured as described for the multimedia communication devices 100, 160, 932, 934, 936, and 938 in FIGS. 1-9. First and second multimedia communication devices 1020 and 1040 are positioned in landscape orientations and horizontally adjacent to each other. In some implementations, the first and second multimedia communication devices 1020 and 1040 are at fixed positions, such as mounted on a wall or stand. In some implementations, the second multimedia communication device 1040 may be dynamically combined, including during an ongoing video conferencing session, with the first multimedia communication device 1020 to provide the larger multimedia communication device 1010. The two multimedia communication devices 1020 and 1040 are communicatively coupled to operate together as a single larger multimedia communication device or system 1010, which is configured to make use of the RGB cameras 1030a, 1030b, 1030c, 1030d, 1050a, 1050b, 1050c, and 1050d, and the depth cameras 1035a, 1035b, 1055a, and 1055b, arranged behind display devices 1025 and 1045. Other numbers, orientations, and arrangements of multiple devices may be used, such as, but not limited to, multiple devices positioned in portrait orientations and horizontally to each other, and arrays of devices (for example, a 2×2 array). Such arrangements offer more cameras, and a wider FOV. Additionally, multiprocessing may be performed among multiple multimedia communication devices.

The detailed examples of systems, devices, and techniques described in connection with FIGS. 1-10 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-10 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

FIG. 11 is a block diagram 1100 illustrating an example software architecture 1102, various portions of which may be used in conjunction with various hardware architectures herein described, which may implement any of the above-described features. FIG. 11 is a non-limiting example of a software architecture and it will be appreciated that many other architectures may be implemented to facilitate the functionality described herein. The software architecture 1102 may execute on hardware such as a device 120 of FIG. 1A that includes, among other things, document storage 1170, processors, memory, and input/output (I/O) components. A representative hardware layer 1104 is illustrated and can represent, for example, the device 120 of FIG. 1. The representative hardware layer 1104 includes a processing unit 1106 and associated executable instructions 1108. The executable instructions 1108 represent executable instructions of the software architecture 1102, including implementation of the methods, modules and so forth described herein. The hardware layer 1104 also includes a memory/storage 1110, which also includes the executable instructions 1108 and accompanying data. The hardware layer 1104 may also include other hardware modules 1112. Instructions 1108 held by processing unit 1108 may be portions of instructions 1108 held by the memory/storage 1110.

The example software architecture 1102 may be conceptualized as layers, each providing various functionality. For example, the software architecture 1102 may include layers and components such as an operating system (OS) 1114, libraries 1116, frameworks 1118, applications 1120, and a presentation layer 1124. Operationally, the applications 1120 and/or other components within the layers may invoke API calls 1124 to other layers and receive corresponding results 1126. The layers illustrated are representative in nature and other software architectures may include additional or different layers. For example, some mobile or special purpose operating systems may not provide the frameworks/middleware 1118.

The OS 1114 may manage hardware resources and provide common services. The OS 1114 may include, for example, a kernel 1128, services 1130, and drivers 1132. The kernel 1128 may act as an abstraction layer between the hardware layer 1104 and other software layers. For example, the kernel 1128 may be responsible for memory management, processor management (for example, scheduling), component management, networking, security settings, and so on. The services 1130 may provide other common services for the other software layers. The drivers 1132 may be responsible for controlling or interfacing with the underlying hardware layer 1104. For instance, the drivers 1132 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1116 may provide a common infrastructure that may be used by the applications 1120 and/or other components and/or layers. The libraries 1116 typically provide functionality for use by other software modules to perform tasks, rather than rather than interacting directly with the OS 1114. The libraries 1116 may include system libraries 1134 (for example, C standard library) that may provide functions such as memory allocation, string manipulation, file operations. In addition, the libraries 1116 may include API libraries 1136 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1116 may also include a wide variety of other libraries 1138 to provide many functions for applications 1120 and other software modules.

The frameworks 1118 (also sometimes referred to as middleware) provide a higher-level common infrastructure that may be used by the applications 1120 and/or other software modules. For example, the frameworks 1118 may provide various graphic user interface (GUI) functions, high-level resource management, or high-level location services. The frameworks 1118 may provide a broad spectrum of other APIs for applications 1120 and/or other software modules.

The applications 1120 include built-in applications 1120 and/or third-party applications 1122. Examples of built-in applications 1120 may include, but are not limited to, a contacts application, a browser application, a location application, a media application, a messaging application, and/or a game application. Third-party applications 1122 may include any applications developed by an entity other than the vendor of the particular platform. The applications 1120 may use functions available via OS 1114, libraries 1116, frameworks 1118, and presentation layer 1124 to create user interfaces to interact with users.

Some software architectures use virtual machines, as illustrated by a virtual machine 1128. The virtual machine 1128 provides an execution environment where applications/modules can execute as if they were executing on a hardware machine (such as the machine 1000 of FIG. 10, for example). The virtual machine 1128 may be hosted by a host OS (for example, OS 1114) or hypervisor, and may have a virtual machine monitor 1126 which manages operation of the virtual machine 1128 and interoperation with the host operating system. A software architecture, which may be different from software architecture 1102 outside of the virtual machine, executes within the virtual machine 1128 such as an OS 1150, libraries 1152, frameworks 1154, applications 1156, and/or a presentation layer 1158.

FIG. 12 is a block diagram illustrating components of an example machine 1200 configured to read instructions from a machine-readable medium (for example, a machine-readable storage medium) and perform any of the features described herein. The example machine 1200 is in a form of a computer system, within which instructions 1216 (for example, in the form of software components) for causing the machine 1200 to perform any of the features described herein may be executed. As such, the instructions 1216 may be used to implement modules or components described herein. The instructions 1216 cause unprogrammed and/or unconfigured machine 1200 to operate as a particular machine configured to carry out the described features. The machine 1200 may be configured to operate as a standalone device or may be coupled (for example, networked) to other machines. In a networked deployment, the machine 1200 may operate in the capacity of a server machine or a client machine in a server-client network environment, or as a node in a peer-to-peer or distributed network environment. Machine 1200 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1200 is illustrated, the term "machine" include a collection of machines that individually or jointly execute the instructions 1216.

The machine 1200 may include processors 1210, memory 1230, and I/O components 1250, which may be communicatively coupled via, for example, a bus 1202. The bus 1202 may include multiple buses coupling various elements of machine 1200 via various bus technologies and protocols. In an example, the processors 1210 (including, for example, a central processing unit (CPU), a graphics processing unit (GPU), a digital signal processor (DSP), an ASIC, or a suitable combination thereof) may include one or more processors 1212a to 1212n that may execute the instructions 1216 and process data. In some examples, one or more processors 1210 may execute instructions provided or identified by one or more other processors 1210. The term "processor" includes a multi-core processor including cores that may execute instructions contemporaneously. Although FIG. 12 shows multiple processors, the machine 1200 may include a single processor with a single core, a single processor with multiple cores (for example, a multi-core processor), multiple processors each with a single core, multiple processors each with multiple cores, or any combination thereof. In some examples, the machine 1200 may include multiple processors distributed among multiple machines.

The memory/storage 1230 may include a main memory 1232, a static memory 1234, or other memory, and a storage unit 1236, both accessible to the processors 1210 such as via the bus 1202. The storage unit 1236 and memory 1232, 1234 store instructions 1216 embodying any one or more of the functions described herein. The memory/storage 1230 may also store temporary, intermediate, and/or long-term data for processors 1210. The instructions 1216 may also reside, completely or partially, within the memory 1232, 1234, within the storage unit 1236, within at least one of the processors 1210 (for example, within a command buffer or cache memory), within memory at least one of I/O components 1250, or any suitable combination thereof, during execution thereof. Accordingly, the memory 1232, 1234, the storage unit 1236, memory in processors 1210, and memory in I/O components 1250 are examples of machine-readable media.

As used herein, "machine-readable medium" refers to a device able to temporarily or permanently store instructions and data that cause machine 1200 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1216) for execution by a machine 1200 such that the instructions, when executed by one or more processors 1210 of the machine 1200, cause the machine 1200 to perform and one or more of the features described herein. Accordingly, a "machine-readable medium" may refer to a single storage device, as well as "cloud-based" storage systems or storage networks that include multiple storage apparatus or devices.

The I/O components 1250 may include a wide variety of hardware components adapted to receive input, provide output, produce output, transmit information, exchange information, capture measurements, and so on. The specific I/O components 1250 included in a particular machine will depend on the type and/or function of the machine. For example, mobile devices such as mobile phones may include a touch input device, whereas a headless server or IoT device may not include such a touch input device. The particular examples of I/O components illustrated in FIG. 12 are in no way limiting, and other types of components may be included in machine 1200. The grouping of I/O components 1250 are merely for simplifying this discussion, and the grouping is in no way limiting. In various examples, the I/O components 1250 may include user output components 1252 and user input components 1254. User output components 1252 may include, for example, display components for displaying information (for example, a liquid crystal display (LCD) or a projector), acoustic components (for example, speakers), haptic components (for example, a vibratory motor or force-feedback device), and/or other signal generators. User input components 1254 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1250 may include biometric components 1256 and/or position components 1262, among a wide array of other environmental sensor components. The biometric components 1256 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1262 may include, for example, location sensors (for example, a Global Position System (GPS) receiver), altitude sensors (for example, an air pressure sensor from which altitude may be derived), and/or orientation sensors (for example, magnetometers).

The I/O components 1250 may include communication components 1264, implementing a wide variety of technologies operable to couple the machine 1200 to network(s) 1270 and/or device(s) 1280 via respective communicative couplings 1272 and 1282. The communication components 1264 may include one or more network interface components or other suitable devices to interface with the network(s) 1270. The communication components 1264 may include, for example, components adapted to provide wired communication, wireless communication, cellular communication, Near Field Communication (NFC), Bluetooth communication, Wi-Fi, and/or communication via other modalities. The device(s) 1280 may include other machines or various peripheral devices (for example, coupled via USB).

In some examples, the communication components 1264 may detect identifiers or include components adapted to detect identifiers. For example, the communication components 1264 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1262, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A video conferencing system comprising:
   a first device including a first display device and a first camera;
   one or more processors; and
   one or more computer readable media including instructions which, when executed by the one or more processors, cause the one or more processors to:
      obtain a first RGB (red-green-blue) image captured, at a first time during a video conferencing session, by the first camera, wherein the first camera is positioned to capture the first RGB image through a first pixel display region of the first display device;
      receive at the first device, via the video conferencing session, a first video stream providing a first series of live images of a first human participant of the video conferencing session, wherein the first series of live images includes a first image portion depicting the eyes of the first human participant;
      display, at about the first time, a first composite image on the first display device, wherein a first pixel position of the first composite image is displayed by the first pixel display region;
      before the display of the first composite image, composite the first image portion at about the first pixel position in the first composite image;
      segment a first foreground image, corresponding to a second human participant of the video conferencing session, from the first RGB image; and
      cause, via the video conferencing session, a second composite image to be displayed by a second device at a different geographic location than the first device, wherein the second composite image includes the first foreground image composited with a first background image.

2. The video conferencing system of claim 1, wherein the first pixel position has a first longitudinal pixel position in the first composite image, and wherein the instructions further cause the one or more processors to, in response to the selection of the first camera and before the display of the first composite image, composite the first image portion at about the first longitudinal pixel position in the first composite image.

3. The video conferencing system of claim 1, wherein the first pixel position has a first lateral pixel position in the first composite image, and wherein the instructions further cause the one or more processors to, in response to the selection of the first camera and before the display of the first composite image, composite the first image portion at about the first lateral pixel position in the first composite image.

4. The video conferencing system of claim 3, further comprising:
   the second device; and
   a second camera included in the second device,
   wherein the instructions further cause the one or more processors to:
      obtain a second RGB image captured by the second camera, wherein the second camera is positioned to capture the second RGB image through a second pixel display region of a second display device included in the second device;
      segment a second foreground image, corresponding to the first human participant and including the first image portion, from the second RGB image;
      receive at the second device, via the video conferencing session, a second video stream providing a second series of live images of the second human participant of the video conferencing session, wherein the first series of live images includes a second image portion included in the first foreground image and depicting the eyes of the second human participant;
      identify the first image portion as a portion of the first foreground image depicting the eyes of the first human participant;
      identify the second image portion as a portion of the second foreground image depicting the eyes of the second human participant;
      display, during the video conferencing session, the second composite image on the second display device, wherein a second pixel position of the second composite image is displayed by the second pixel display region, the second pixel position having a second lateral pixel position in the second composite image; and
      before the display of the second composite image, composite the second image portion at about the second lateral pixel position in the second composite image.

5. The video conferencing system of claim 4, wherein:
   the first device includes a first plurality of cameras including the first camera;
   each of the first plurality of cameras is positioned to capture RGB images through the first display device; and
   the instructions further cause the one or more processors to select, during the video conferencing session, the first camera from the first plurality of cameras included in the first device.

6. The video conferencing system of claim 5, wherein the instructions further cause the one or more processors to:
   detect a change in physical position of a third participant of the video conferencing session to a first physical position relative to a third device being used by the third participant to access the video conferencing session;
   select, during the video conferencing session, a second camera from the first plurality of cameras in response to the detected change in physical position, wherein the second camera is different from the first camera, and the second camera is positioned to capture RGB images through a second pixel display region of the first display device, wherein:

the first series of live images includes a second image portion depicting the eyes of the first human participant, the second pixel display region is at a different lateral position of the first display device than the first pixel display region, the second image portion was captured by a camera after the selection of the second camera, and the instructions further cause the one or more processors to:

display, at a second time during the video conferencing session, a third composite image on the first display device, wherein a second pixel position of the third composite image is displayed by the second pixel display region, in response to the selection of the second camera and before the display of the third composite image, composite the second image portion at about the second lateral pixel position in the third composite image, obtain a second RGB image captured by the second camera at about the second time through the second pixel display region, segment a second foreground image, corresponding to the second human participant, from the second RGB image, and cause, via the video conferencing session, a fourth composite image to be displayed by the second device, wherein the fourth composite image includes the second foreground image composited with a second background image.

7. The video conferencing system of claim 5, wherein the instructions further cause the one or more processors to:

determine a physical position of the first human participant relative to the second device during the video conferencing session, select the first camera based on the determined physical position of the first human participant.

8. The video conferencing system of claim 4, wherein:

the first device includes a first plurality of cameras including the first camera;

each of the first plurality of cameras is positioned to capture RGB images through the first display device;

the second device includes a second plurality of cameras including the second camera;

each of the second plurality of cameras is positioned to capture RGB images through the second display device; and the instructions further cause the one or more processors to:

determine a first physical position of the first human participant relative to the second device during the video conferencing session, determine a second physical position of the second human participant relative to the first device during the video conferencing session, select, during the video conferencing session and based on the determined second physical position of the second human participant, the second camera from the second plurality of cameras, and select, during the video conferencing session and based on the determined first physical position of the first human participant, the first camera from the first plurality of cameras.

9. The video conferencing system of claim 1, wherein the instructions further cause the one or more processors to:

perform the segmentation of the first foreground image from the first RGB image at the first device; and composite, at the first device, the first foreground image with the first background image to produce the second composite image.

10. The video conferencing system of claim 1, wherein:

the first device includes a depth camera; and the instructions further cause the one or more processors to:

obtain a depth image captured, at about the first time, by the depth camera;

identify a first portion of the depth image based on at least discontinuities in the depth image around edges of the first portion;

identify translated positions in the first RGB image that correspond to depth estimates for the first portion of the depth image; and segment the first foreground image from the first RGB image based on at least the translated positions.

11. A method for video conferencing comprising:

obtaining a first RGB (red-green-blue) image captured, at a first time during a video conferencing session, by a first camera included in a first device, wherein the first camera is positioned to capture the first RGB image through a first pixel display region of a first display device included in the first device;

receiving at the first device, via the video conferencing session, a first video stream providing a first series of live images of a first human participant of the video conferencing session, wherein the first series of live images includes a first image portion depicting the eyes of the first human participant;

displaying, at about the first time, a first composite image on the first display device, wherein a first pixel position of the first composite image is displayed by the first pixel display region;

before the display of the first composite image, compositing the first image portion at about the first pixel position in the first composite image;

segmenting a first foreground image, corresponding to a second human participant of the video conferencing session, from the first RGB image; and causing, via the video conferencing session, a second composite image to be displayed by a second device at a different geographic location than the first device, wherein the second composite image includes the first foreground image composited with a first background image.

12. The method of claim 11, wherein:

the first pixel position has a first longitudinal pixel position in the first composite image; and the compositing the first image portion in the first composite image includes compositing the first image portion at about the first longitudinal pixel position in the first composite image.

13. The method of claim 11, wherein:

the first pixel position has a first lateral pixel position in the first composite image; and the compositing the first image portion in the first composite image includes compositing the first image portion at about the first lateral pixel position in the first composite image.

14. The method of claim 13, further comprising:
obtaining a second RGB image captured by a second camera included in the second device, wherein the second camera is positioned to capture the second RGB image through a second pixel display region of a second display device included in the second device;
segmenting a second foreground image, corresponding to the first human participant and including the first image portion, from the second RGB image;
receiving at the second device, via the video conferencing session, a second video stream providing a second series of live images of the second human participant of the video conferencing session, wherein the first series of live images includes a second image portion included in the first foreground image and depicting the eyes of the second human participant;
identifying the first image portion as a portion of the first foreground image depicting the eyes of the first human participant;
identifying the second image portion as a portion of the second foreground image depicting the eyes of the second human participant;
displaying, during the video conferencing session, the second composite image on the second display device, wherein a second pixel position of the second composite image is displayed by the second pixel display region, the second pixel position having a second lateral pixel position in the second composite image; and
before the display of the second composite image, compositing the second image portion at about the second lateral pixel position in the second composite image.

15. The method of claim 14, further comprising selecting, during the video conferencing session, the first camera from a first plurality of cameras included in the first device, wherein each of the first plurality of cameras is positioned to capture RGB images through the first display device.

16. The method of claim 15, further comprising:
detecting a change in physical position of a third participant of the video conferencing session to a first physical position relative to a third device being used by the third participant to access the video conferencing session;
selecting, during the video conferencing session, a second camera from the first plurality of cameras in response to the detected change in physical position, wherein the second camera is different from the first camera, and the second camera is positioned to capture RGB images through a second pixel display region of the first display device,
wherein:
the first series of live images includes a second image portion depicting the eyes of the first human participant,
the second pixel display region is at a different lateral position of the first display device than the first pixel display region,
the second image portion was captured by a camera after the selection of the second camera, and
the method further comprises:
displaying, at a second time during the video conferencing session, a third composite image on the first display device, wherein a second pixel position of the third composite image is displayed by the second pixel display region,
in response to the selection of the second camera and before the display of the third composite image, compositing the second image portion at about the second lateral pixel position in the third composite image,
obtaining a second RGB image captured by the second camera at about the second time through the second pixel display region,
segmenting a second foreground image, corresponding to the second human participant, from the second RGB image, and
causing, via the video conferencing session, a fourth composite image to be displayed by the second device, wherein the fourth composite image includes the second foreground image composited with a second background image.

17. The method of claim 15, further comprising:
determining a physical position of the first human participant relative to the second device during the video conferencing session,
wherein the selection of the first camera is based on the determined physical position of the first human participant.

18. The method of claim 14, further comprising:
determining a first physical position of the first human participant relative to the second device during the video conferencing session;
determining a second physical position of the second human participant relative to the first device during the video conferencing session; and
selecting, during the video conferencing session and based on the determined second physical position of the second human participant, the second camera from a second plurality of cameras included in the second device, wherein each of the second plurality of cameras is positioned to capture RGB images through the second display device,
wherein the selection of the first camera is based on the determined first physical position of the first human participant.

19. The method of claim 11, wherein:
the segmenting the first foreground image from the first RGB image is performed at the first device; and
the method further comprises compositing, at the first device, the first foreground image with the first background image to produce the second composite image.

20. The method of claim 11, further comprising:
obtaining a depth image captured, at about the first time, by a depth camera included in the first device;
identifying a first portion of the depth image based on at least discontinuities in the depth image around edges of the first portion; and
identifying translated positions in the first RGB image that correspond to depth estimates for the first portion of the depth image,
wherein the segmenting the first foreground image from the first RGB image is based on at least the translated positions.

21. The method of claim 11, further comprising:
obtaining a first distance between the first device and the second participant;
obtaining a second distance between the second device and the first participant;
determining an apparent distance based on at least the first distance and the second distance; and generating the second composite image by scaling the first foreground image based on the apparent distance.

22. A nontransitory computer readable medium including instructions recorded thereon which, when executed by one or more processors, cause the processors to perform the method of claim 11.

* * * * *